United States Patent [19]

Si et al.

[11] Patent Number: 4,800,516

[45] Date of Patent: Jan. 24, 1989

[54] HIGH SPEED FLOATING-POINT UNIT

[75] Inventors: Stephen S. C. Si, Milpitas; H. P. Sherman Lee; Stephen J. Rawlinson, both of Sunnyvale, all of Calif.

[73] Assignee: Amdahl Corporation, Sunnyvale, Calif.

[21] Appl. No.: 925,997

[22] Filed: Oct. 31, 1986

[51] Int. Cl.[4] .................................................. G06F 7/38
[52] U.S. Cl. .................................................. 364/748
[58] Field of Search .............. 364/748, 200, 736, 754, 364/757

[56] References Cited

U.S. PATENT DOCUMENTS

| 4,075,704 | 2/1978 | O'Leary | 364/748 |
| 4,161,784 | 7/1979 | Cushing et al. | 364/748 |
| 4,488,252 | 12/1984 | Vassar | 364/748 |
| 4,509,116 | 4/1985 | Lackey et al. | 364/200 |
| 4,562,553 | 12/1985 | Mattedi et al. | 364/745 |
| 4,589,067 | 5/1986 | Porter et al. | 364/200 |
| 4,644,491 | 2/1987 | Ookawa et al. | 364/784 |
| 4,649,508 | 3/1987 | Kanuma | 364/748 |
| 4,707,783 | 11/1987 | Lee et al. | 364/200 |

Primary Examiner—Gary V. Harkcom
Assistant Examiner—Tan V. Mai
Attorney, Agent, or Firm—Fliesler, Dubb, Meyer & Lovejoy

[57] ABSTRACT

In a floating point arithmetic unit, high speed computation is achieved by providing logic for determining whether operands of an instruction have a predetermined condition with respect to the instruction and logic responsive thereto for bypassing selective primitive operations when such predetermined condition exists.

14 Claims, 4 Drawing Sheets

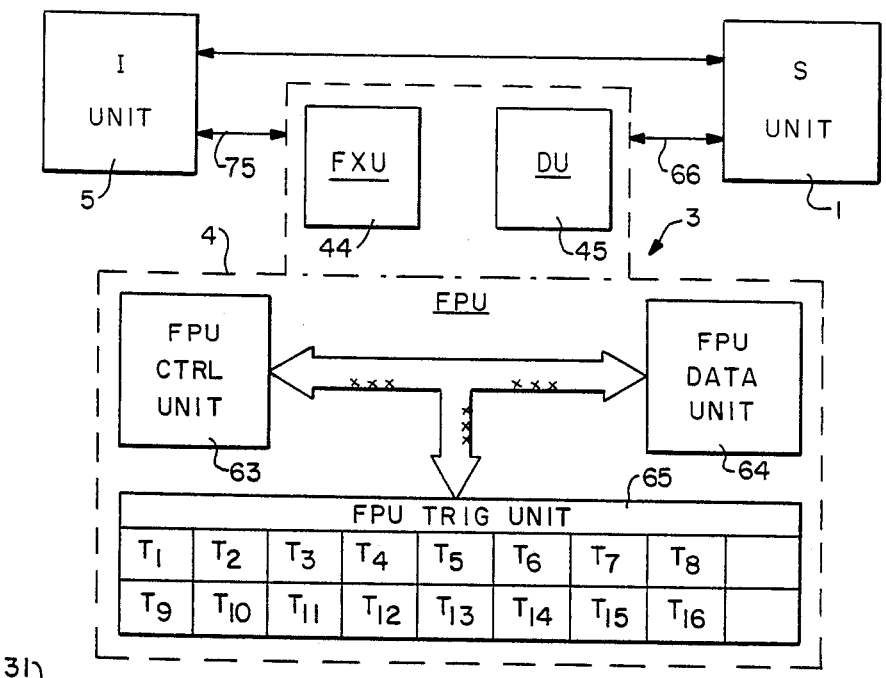
FIG.—1
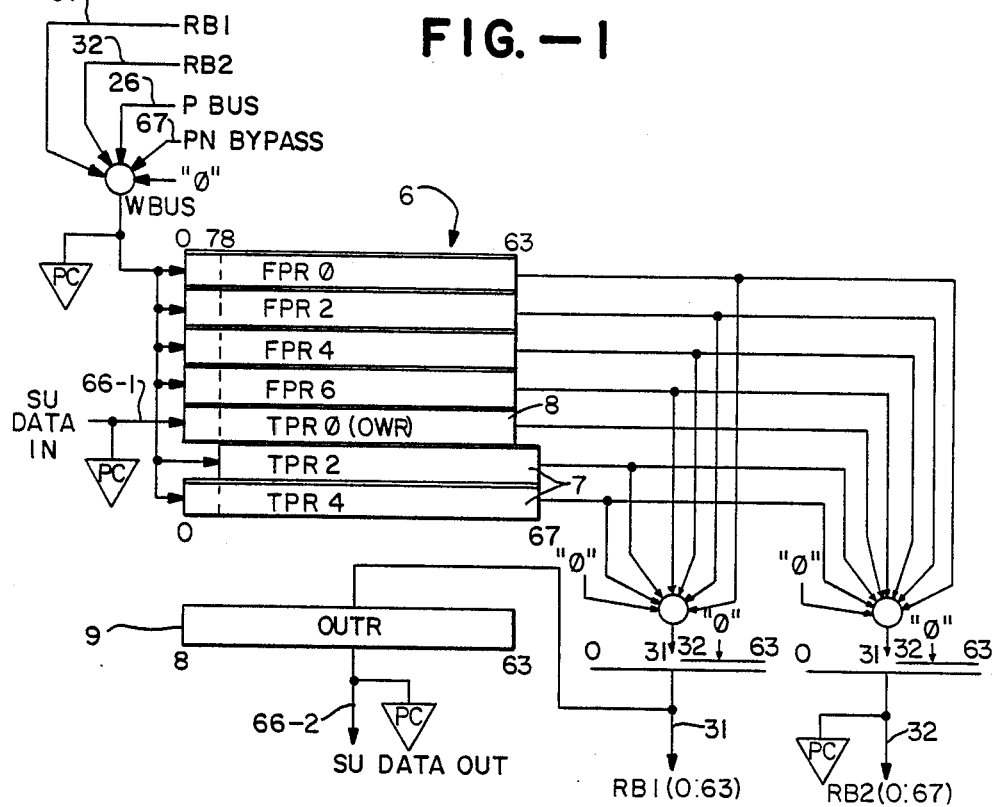
FIG.—2

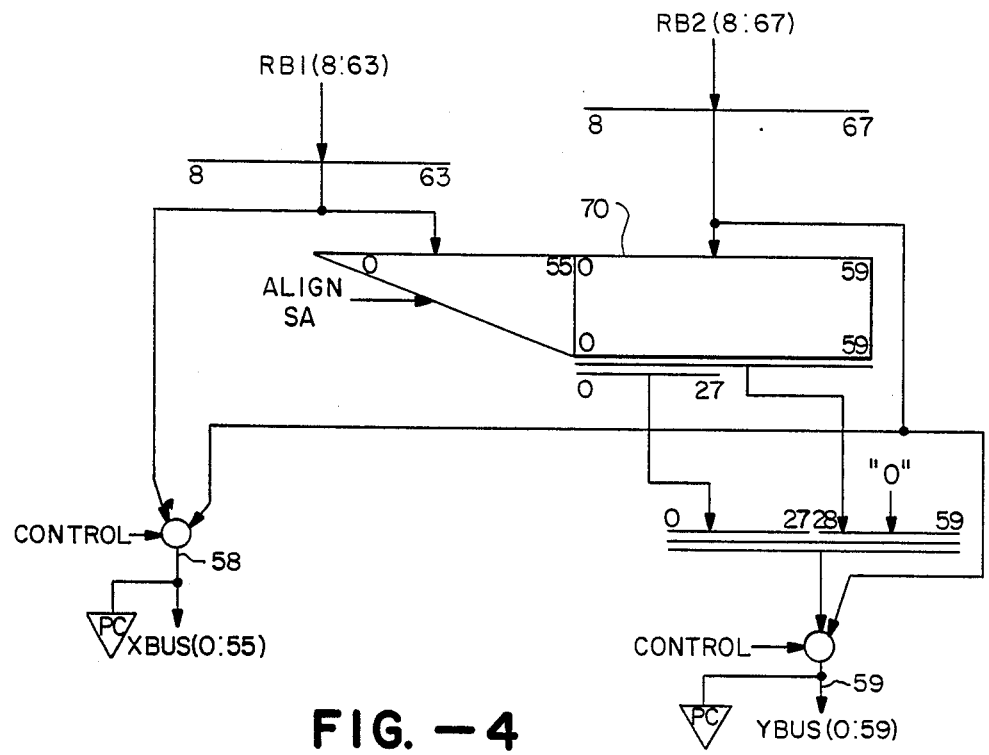
FIG. —4
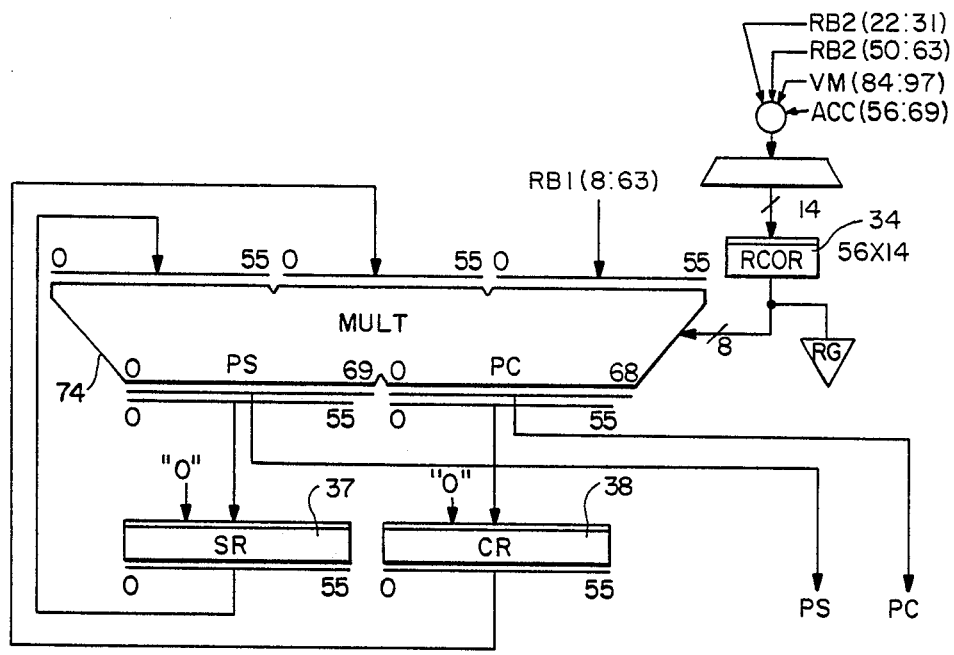
FIG. —6

HIGH SPEED FLOATING-POINT UNIT

CROSS REFERENCE TO RELATED APPLICATION (1) PIPELINED DATA PROCESSING SYSTEM UTILIZING IDEAL FLOATING POINT EXECUTION CONDITION DETECTION, invented by Hsiao-Peng Sherman Lee, Stephen J. Rawlinson and Stephen S.C. Si. Ser. No. 663,085, filed Oct. 19, 1984.

BACKGROUND OF THE INVENTION

The present invention relates to high speed pipeline data processing systems and, in particular, to a pipelined floating point execution unit utilizing ideal operand manipulation condition detection for the selection of optimal execution flow.

High speed data processing systems typically are provided with high-speed floating point units that perform floating point operations such as add, subtract, compare, and multiply. These systems typically utilize a pipelined architecture providing for a multistaged data flow that is controlled at each stage by control logic.

The multiple stage pipelined architecture allows multiple instructions to be processed concurrently in the pipeline. Generally, the instructions in the pipeline have a one stage offset from one another thereby optimizing the utilization of available hardware. Each instruction typically progresses from one stage to the next successive stage with each clock cycle.

The actual data flow through the instruction pipeline is controlled within each stage, for example, by microcode stored in a control store. The instruction itself addresses the control store to select a corresponding micro-code control word. The control word, in turn, enables specific data paths to perform the desired data manipulation.

Each stage of the pipeline implements a substantial number of functions in parallel, thus minimizing the number of stages required to implement any given instruction. The instruction execution speed of pipelined data processing systems is typically greater than comparable non-pipelined systems utilizing a similar number of execution stages. Enhancements in the execution speed of such pipelined systems is naturally desirable.

FLOATING-POINT NUMBERS

Floating point numbers, as defined for example in the "IBM System/370 Principles of Operation" (IBM POO), have three formats, short, long and extended. All three of them use the base-16 number system. Because computations with extended operands are used only rarely, only short and long formats are of interest herein.

| | | Short Floating-Point Format: | | | |
|---|---|---|---|---|---|
| @ | S | @ Exp | @ | 6-Digit Fraction | @ |
| | 0 | 1 | 8 | | 31 |
| | | Long Floating-Point Format: | | | |
| @ | S | @ Exp | @ | 17-Digit Fraction | @ |
| | 0 | 1 | 8 | | 63 |

Short floating-point numbers are 32 bits wide, and long floating-point numbers are 64 bits wide. In each case, there is a 1-bit sign and a 7-bit exponent. The exponent is represented by an excess-64 format; that is, 64 is added to the value of the exponent to obtain the exponent representation. Therefore, a value of $-64$ (the minimum value that can be represented) is represented as zero; a value of $+63$ (the maximum value that can be represented) is represented as $+127$. Long floating-point numbers have fractions consisting of 14, 4-bit digits. Short floating-point numbers have fractions consisting of 6, 4-bit digits. A positive sign is represented by a sign bit of zero, and a negative sign is represented by a sign bit of one. Note that the fraction field is an unsigned (positive) number, and that a separate 1-bit sign field indicates whether the composite number is positive or negative. Normalized floating-point numbers have a nonzero digit in the leftmost digit position of the fraction.

An exponent overflow condition exists if a number is so large in magnitude that it cannot be represented with a 7-bit exponent. If the result of an operation creates such a condition, then the result is stored with the exponent too small by 128, and a program interruption takes place.

An exponent underflow condition exists if a nonzero number is so small in magnitude that it cannot be represented in normalized form with a 7-bit exponent. If the result of an operation creates such a condition and the exponent-underflow mask bit is on, then the result is stored with the exponent too large by 128, and a program interruption takes place. If the condition occurs with the exponent-underflow mask bit off, then a true zero is stored as the result, and no program interruption takes place. A true zero has a zero in the exponent field, a zero fraction and a positive sign.

If addition or subtraction produces an intermediate result of zero and if the significance mask bit is on, then the result stored is that of the intermediate exponent with the fraction made to be zero and the sign made to be positive, and a program interruption takes place. If addition or subtraction produces an intermediate result of zero and if the significance mask bit is off, then the result stored is a true zero, and no program interruption takes place.

FLOATING-POINT ADDITION AND SUBTRACTION

Floating-point addition (and subtraction) as specified by the IBM POO consists of exponent comparison, fraction alignment, and fraction addition. After the exponents are compared, the fraction in the number with the smaller exponent is aligned by being shifted right the number of digits by which the exponents differ. Then the fractions are added or subtracted. If addition is specified and the operand signs are the same, or if subtraction is specified and the operand signs differ, then the fractions are added. If addition is specified and the operand signs differ, or if subtraction is specified and the operand signs are the same, then the fractions are subtracted. If a subtraction is performed, and if the result of the subtraction is negative, then the result fraction must be recomplemented and the predicted sign of the result must be inverted.

Some addition and subtraction instructions specify that the result of normalized. If normalization is specified and the result of adding fractions produced one or more leading zero digits with no carry out, or if normalization is specified and the result of subtracting fractions produced one or more leading zero digits, then the fraction must be shifted left until the leftmost digit is nonzero and the exponent must be decreased by the number of digit positions that the fraction was shifted. (The exception to this rule is that the normalization process is not carried out when the result is zero.) Whether or not normalization is specified, a carry out from an addition requires that the result fraction be shifted right one position with a digit of '1' being shifted in, and that the exponent by increased by one.

After normalization, a test is made for program interruption conditions. If there is an exponent underflow with the exponent-underflow mask bit off or a zero result with the significance mask bit off, the result must be converted to a true zero.

A two-bit condition code is set at the end of the operation. If the result of the operation is zero, then the condition code is set to zero. (This includes the case where there was an exponent underflow and the exponent-underflow mask was zero.) If the result is negative, then the condition code is set to one. If the result is positive, then the condition code is set to two (For floating-point addition and subtraction, the condition code is never set to three.)

FLOATING-POINT COMPARE

Floating-point comparison as specified by the IBM POO follows the procedure for normalized floating-point subtraction, except that the result is discarded and only the condition code is changed. If result of the operation is zero, then the condition code is set to zero. (Unlike addition and subtraction, this does not include the case where there was an exponent underflow and the exponent-underflow mask was zero.) If the result is negative, then the condition code is set to one. If the result is positive, then the condition code is set to two. (For floating-point comparison, the condition code is never set to three.)

FLOATING-POINT MULTIPLY

Floating-point multiplication as specified by the IBM POO consists of exponent addition and fraction multiplication. After the fractions are multiplied, they must be normzlied in the same manner as for normalized addition and subtraction. Tests for exponents overflow and exponent underflow are the same as for normalized addition and subtraction, but no significance exception is reported and the condition code is not changed. If the product fraction is zero, then the result is stored as a true zero with the exponent set to zero and the sign set to plus.

FLOATING-POINT INSTRUCTION FORMATS

All floating-point instructions defined in the IBM POO are one of two formats: RR and RX. RR-format insructions operate on two register operands. The RX-format instructions operate on one register operand and one storage operand. A register operand resides in one of four floating-point registers (FPR0, FPR2, FPR4, FPR6). A storage operand resides in storage.

The above-application entitled PIPELINED DATA PROCESSING SYSTEM UTILIZING IDEAL FLOATING POINT EXECUTION CONDITION DETECTION, describes among other things, logic to predict whether ideal floating-point add condition exist. Based upon this prediction, certain floating point operations were executed more quickly. However, there is a need for even greater speed of execution of floating point instructions.

SUMMARY OF THE INVENTION

The present invention is a system having a floating unit for the high-speed execution of normalized floating-point addition and subtraction, unnormalized floating-point addition and subtraction, and multiplication. The system includes alignment-bypass logic, postnormalization-bypass logic, and an absolute adder. The present invention employs bypass alignment and/or postnormalization when ideal conditions are detected to thereby enhance the performance of floating point instructions.

Performance improvement is achieved for floating-point addition, subtraction, comparison, and multiplication.

The computation speedup occurs when the arithmetic operands are of predetermined values called ideal values and almost ideal values. The table below shows the performance difference in cycles for instructions with and without (non-ideal) the present invention.

| Operation | Ideal | Number of Cycles Almost-ideal | Non-ideal |
|---|---|---|---|
| Add/Subtract Normalized | 3 | 4 | 5 |
| Add/Subtract Unnormalized | 3 | 4 | 4 |
| Compare | 3 | 4 | 4 |
| Multiply Short | 4 | | 5 |
| Multiply Long | 6 | | 7 |

In accordance with the above summary, the present invention achieves the objective of providing an improved floating point unit.

The foregoing and other objects, features and advantages of the invention will be apparent from the following detailed description in conjunction with the drawings.

BRIEF DESCRIPTION OF THE DRAWINGS

FIG. 1 depicts an overall block diagram of a data processing system including a floating point unit.

FIG. 2 shows a block diagram of a register file unit which forms part of the floating point unit of the FIG. 1 system.

FIG. 4 depicts an alignment unit which forms part of the floating point of FIG. 1.

FIG. 6 depicts a multiplier unit which forms part of the floating point unit of FIG. 1.

DETAILED DESCRIPTION

Figure 3:
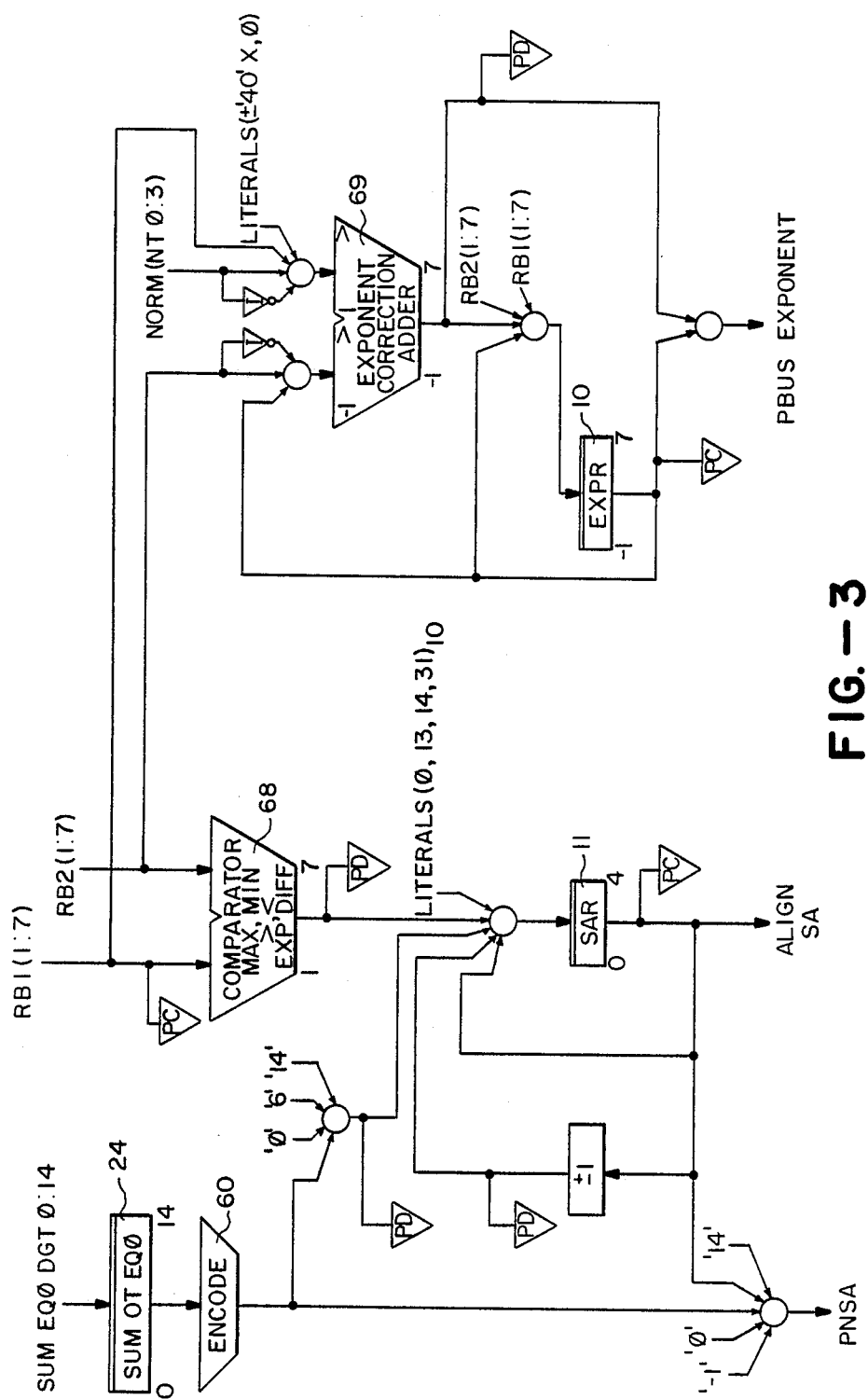
FIG. 3 depicts an exponent unit which forms part of the floating point unit of FIG. 1.

In FIG. 1, the data processing system includes an instruction unit 5, a storage unit 1 and an execution unit 3. Floating point and other instructions are specified by instruction unit 5 over bus 75 to the execution unit 3. The execution unit 3 includes a fixed point unit 44, a decimal unit 45 and a floating point unit 4. The present invention is concerned with the floating point unit 4 and the execution of floating point instructions.

In FIG. 1, the floating point unit 4 includes the FPU control unit 63 and the FPU data unit 64. The unit 63 provides microcode control signals for controlling the data unit 64. Units 63 and 64 rely on the setting of a number of triggers in the FPU trigger unit 65.

The unit 65 includes the triggers $T_1, T_2, ..., T_{16}$ which are defined in the following CHART 1.

CHART 1

| T | TRIGGER |
|---|---|
| $T_1$ | SIGN |
| $T_2$ | SUBTRACT |
| $T_3$ | EXPONENTS EQUAL |
| $T_4$ | OP2 EXPONENT LARGER |
| $T_5$ | CONDITION CODE 0 |
| $T_6$ | CONDITION CODE 1 |
| $T_7$ | CARRY |
| $T_8$ | RECOMPLEMENT |
| $T_9$ | OP2 NORMAL |
| $T_{19}$ | EXPONENT = "7F" |
| $T_{11}$ | IDEAL CONDITION |
| $T_{12}$ | OP1 NORMAL |
| $T_{13}$ | PRODUCT |
| $T_{14}$ | ZERO |
| $T_{15}$ | ENDING NEXT CYCLE |
| $T_{16}$ | INTERRUPT |

In FIG. 1, the control unit 63 is a microcode controller which issues the various control signals for controlling the data unit 64.

APPENDIX A represents the control code for an add/subtract normalized long operation.

APPENDIX B represents the control microcode for an add/subtract unnormalized short.

APPENDIX C represents the control microcode for a compare long.

APPENDIX D represents the control microcode for multiply short.

The Floating Point Unit (FPU) 4 of FIG. 1 executes floating-point instructions, for example, those described in the IBM POO using the microcode of APPENDIX A through APPENDIX D or any other conventional control mechanism. Except for certain load and store instructions, each FPU instruction requires more than one execution cycle to be run on the FPU. Whenever the FPU needs more than one cycle to execute an instruction, it must send a signal ("Ending Next Cycle") from trigger $T_{16}$ during the cycle before the last cycle to the Instruction Unit (IU) 5. It must also supply the interrupt condition from trigger $T_{15}$ (exponent overflow, exponent underflow and significance) and the condition code from triggers $T_5$ and $T_6$ (where applicable) in the last cycle of the execution.

In FIGS. 2-5, block diagrams of the data paths of the FPU DATA unit 64 in the FPU 4 are shown. The data unit 64 execute the addition, subtraction, and comparison instructions under control of the FPU CTROL unit 63 and the FPU TRIG unit 65.

FIG. 2 shows the Floating-point registers 6 (FPR0-FPR6), two Temporary Registers 7 (TPR2 and TPR4), the Operand Word Register 8 (OWR), and the Output Register 9 (OUTR). The data paths to and from the registers include the SU bus 66, including SU-In bus 66-1 and SU-Out bus 66-2, include the RBI bus 31, the RB2 bus 32, and P bus 26, and the PN BYPASS bus 67. The storage operand for a RX-type instruction is fetched from the S Unit 1 on bus 66-1 and stored into the OWR 8 before the execution starts. The two operands are selected onto the two read busses (RB1 & RB2).

From FIG. 2, the exponent portions of the two operands are sent to the Exponent Comparator 68 of FIG. 3 where a comparison of the exponents takes place. The larger exponent is then selected through exponent adder 69 and gated into the EXPR register 10. The absolute value of the difference between the two exponents is calculated and stored into the Shift Amount Register 11 (SAR). The sign of operand 1 is loaded into the SIGN TRIGGER $T_1$. SUBTRACT TRIGGER $T_2$, EXPONENTS EQUAL TRIGGER $T_3$, and OP2 EXPONENT LARGER TRIGGER $T_4$ are loaded.

The fraction portions of the operands are then sent via Read Bus 1 and Read Bus 2 (RB1 and RB2) to the Alignment unit of FIG. 4. The fraction with the larger exponent (when the exponents are equal, operand 1 on the RB1 is chosen) is gated onto the X-bus 58. The fraction with the smaller exponent is shifted right as many digits as specified in the SAR 11 (this is the alignment operation), and the shifted fraction is gated onto the Y-bus 59.

Figure 5:
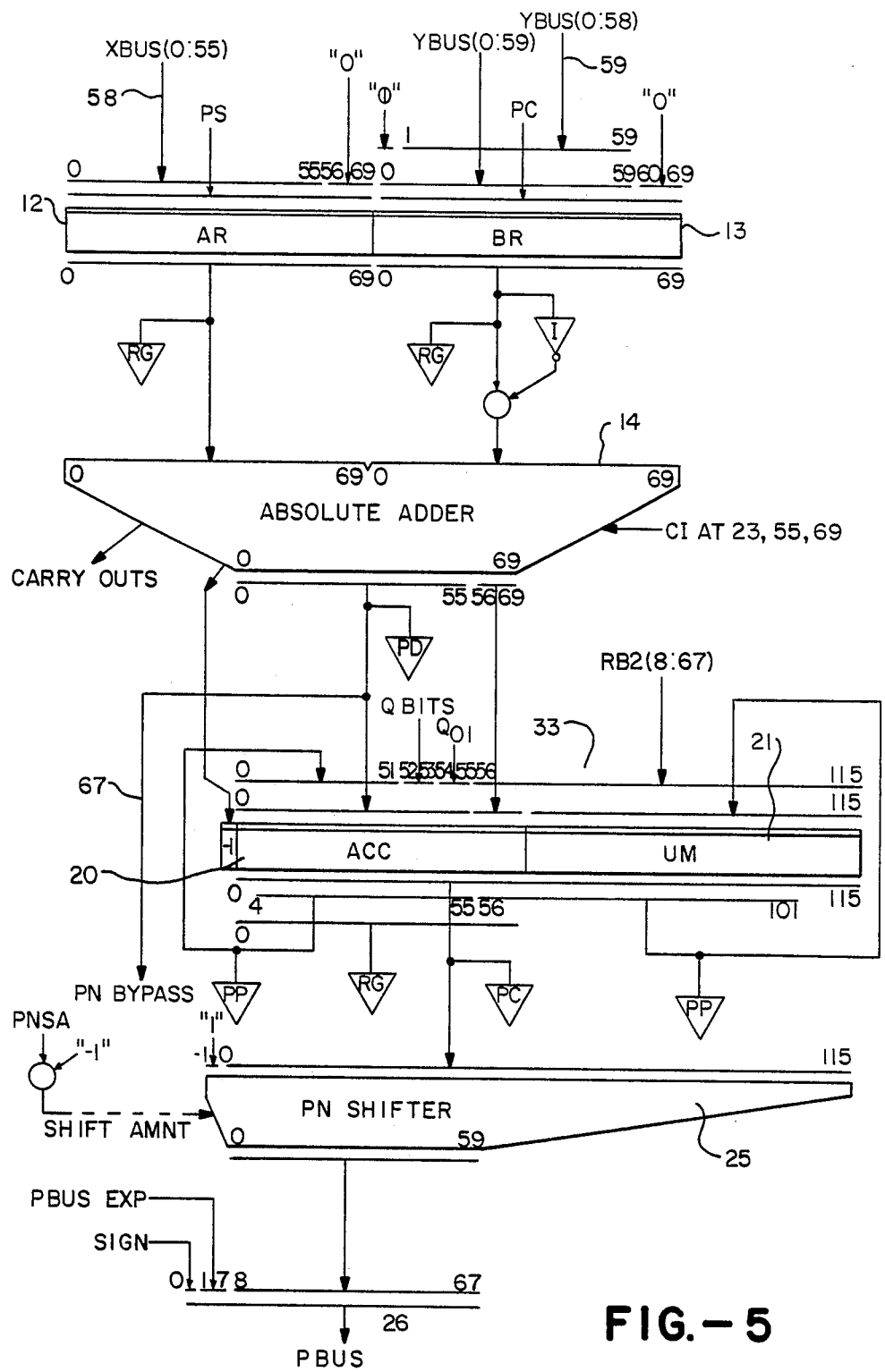
FIG. 5 depicts an absolute adder and postnormalization unit which forms part of the floating point unit of FIG. 1.

The X-bus 58 and Y-bus 59 from FIG. 4 are then ingated into the AR register 12 and BR register 13 respectively (FIG. 5). The AR and BR registers feed the two ports of the Absolute Adder 14. An addition or subtraction (as determined by the SUBTRACT TRIGGER $T_2$) then takes place in the Absolute Adder 14 and the absolute value of the result is generated and loaded into the higher order portion of the Accumulator, the ACC register 20. Zero is loaded into the lower order portion of the Accumulator, the UM register 21. If addition took place and a carry-out occurred, then CARRY TRIGGER $T_7$ is set; otherwise, CARRY TRIGGER $T_7$ is reset. If subtraction took place and the Absolute Adder 14 had to recomplement the sum, the RECOMPLEMENT TRIGGER $T_8$ is set; otherwise, RECOMPLEMENT TRIGGER $T_8$ is reset.

The output of the Absolute Adder 14 is examined for zero result. For compares and normalized adds and subtracts, each digit of the output is examined for zero. For unnormalized adds and subtracts, only the most significant 6 digits (for short operands) or the most significant 14 digits (for long operands) are examined for zero. The information of each digit is stored in the 15 bit wide SUM DT EO 0 register 24 (FIG. 3). From the SUM DT EO 0 register, the leading zero digit count (LZDC) of the result in the ACC 20 is calculated by encoder 60 and stored in the SAR 11.

The result of the fraction addition/subtraction is sent to the Post-normalization shifter 25 (PN Shifter in FIG. 5). If the addition/subtraction operation generated a carry out, then it is shifted right one digit regardless of the LZDC value in the SAR 11. If the addition/subtraction operation did not generate a carry out, then it is shifted left according to the LZDC value in the SAR 11 if the operation was a normalize add or subtract; no shift takes place for unnormalized adds and subtracts. The output of the PN Shifter 25 is selected onto bits 8-63 of the P-bus 26 and is the fraction portion of the result.

Using the Exponent Correction Adder 27 (FIG. 3), the larger exponent of the operand (as stored in the EXPR) is either reduced by the NORM CNT (which is based on the LZDC) if PN Shifter 25 shifts left, or increased by 1 if PN Shifter 25 shifts right, or left unchanged if the PN Shifter 25 does not shift. This adjusted exponent is gated onto bits 1-7 of the P-bus 26 and is the exponent of the result.

The final sign is based on the signs of the operands, whether the operation is addition or subtraction, which operand had the larger exponent, whether the Absolute Adder 14 had to recomplement the sum, and whether the result was replaced by a true zero. The final sign is gated onto bit 0 of the P-bus 26.

The complete result is written into one of the floating-point registers 6 via the P-bus 26. (See FIG. 2).

In FIG. 4, the operand fractions from RB1 and RB2 can be gated directly to the X-Bus 28 and Y-Bus 29 without using the alignment shifter 70. This feature is called alignment bypass. In FIG. 5, the output of the Absolute Adder 14 can also be selected onto the PN BYPASS bus 67 which connects to the same place (see FIG. 2) as the P-bus 26. This feature is called postnormalization bypass. Alignment bypass and postnormalization bypass are used to speed up the floating-point add/subtract instruction execution, as hereinafter described. Alignment bypass is also used to speed up the floating-point compare instruction execution, and post-normalization bypass is also used to speed up the floating-point multiply instruction execution.

FIGS. 2, 3, 5 and 6 depict the data paths of the FPU 4 that execute the multiplication instructions. The data paths in FIGS. 2, 3, and 5 is used for multiplication as well as addition, subtraction, and comparison.

The determination of the sign and exponent in floating-point multiplication is not relevant to this invention and is not discussed therefore. Because computation of the product fraction takes longer than computation of the product sign and exponent, improved performance is obtained in the computation of the product fraction.

The two operands for multiplication are selected onto the two read busses 31 and 32 (RB1 and RB2) as shown in FIG. 2 in the same manner as for addition, subtraction, and comparison. The fraction part of RB2 32 is selected into bits 56–115 of the ACCUM register 33 (formed by ACC 20 and UM 21) of FIG. 5. Bits 0–55 of the ACCUM register 33 receive zero. The low-order bits of the multiplier fraction of RB2 are selected into recorder RCDR register 34 of FIG. 6 to control multiplier 74. For long multiplication, bits 50–63 of RB2 are selected into recorder RCDR; for short multiplication, bits 22–31 of RB2 with 4 trailing zero bits tacked on are selected into RCDR (See FIG. 6). The SR register 72 and CR register 73 are loaded with zero (See FIG. 6). The fraction part of the mutliplicand is maintained on RB1 (bits 8–63) for the following cycles until the multiplication process is complete.

The multiplier 74 of FIG. 6 typically is formed by a carry-save-adder which operates together with recoder 34. Multiplier 74 produces two outputs: a sum and a carry. The sum is loaded into SR register 37 and into AR register 13. The carry is loaded into CR register 58 and into BR register 13 (See FIGS. 5 and 6). In the following cycle, the contents of SR register 37 and CR register 38 are recycled into the carry-save-adder inputs as new multiplier bits are placed in the recoder 34 (See FIG. 6). Also in the following cycle, the contents of AR and BR are summed in the absolute adder 14 of FIG. 5 with the output of the absolute adder being placed into ACCUM bits 0–69. Meanwhile, the contents of ACCUM bits 56–101 are shifted right 14 positions (See FIG. 5).

The multiplication process ends with the product fraction residing in ACCUM possibly in need of postnormalization. The contents of ACCUM are run through the PN SHIFTER 25 and selected into bits 8–63 of the P-Bus 26 to become the fraction portion of the result (See FIG. 5).

IMPLEMENTATION OF NORMALIZED ADDITION AND SUBTRACTION

Using the hardware described, the implementation of a normalized floating-point add/subtract instruction in the FPU 4 without the bypass hardware takes 5 cycles and consists of the following steps:

(1) Compare the exponents and calculate the alignment shift amount.
(2) Align the fraction that has the smaller exponent.
(3) Add or subtract the fractions. Recomplement if the result is negative. If adding and there is a carry out, then set the carry-trigger; otherwise, reset the carry-trigger. If subtracting and the result is negative, then recomplement the result and set the recomplement-trigger; otherwise, reset the recomplement-trigger.
(4) Test if the result of the addition or subtraction in step (3) is zero (result is zero and carry-trigger is not set), and determine the number of leading zero digits in the result fraction. If the result is zero, keep the exponent value. Otherwise, decrement the exponent by the number of leading zero digits in the result fraction if carry-trigger is not set. If carry-trigger is set, then increment the exponent by 1. Determine the sign of the result based on the sign of operand 1, whether operand 1 exponent is larger than operand 2 exponent, whether recomplement-trigger is set, and whether the result is zero.
(5) Set the condition code. Normalize the fraction. Zero the sign and the exponent if the result is zero and the significance mask bit is off. Zero the sign but keep the exponent if the result is zero and the significance mask bit is on. Zero the sign, exponent, and fraction if there is an exponent underflow and the exponent-underflow mask bit is off. Store the sign, exponent and fraction into the result floating-point register. Tested for significance, exponent overflow and exponent underflow interruption conditions. Post interruption accordingly.

By adding bypass hardware, some of the above five steps can be avoided in many instances. When it can be predicted at the very beginning that fraction alignment is not needed, then step (2) can be eliminated. When it can be predicted that post-normalization is not needed, then step (4) can be eliminated, and steps (3) and (5) can be combined. When it can be predicted that an exponent underflow cannot occur even though post-normalization is needed, then steps (4) and (5) can be combined. It is also possible to combine steps (4) and (5) and eliminate step (2) in some cases. Such prediction mechanisms allow many floating-point addition and subtraction operations to take place in 3 or 4 cycles instead of 5 cycles.

Because of a limitation of the IU 5, it is not possible to finish a floating-point add, subtract, or compare instructon in less than 3 cycles. Therefore, there is no point in testing for conditions that would allow the elimination of all of steps (2), (4), and (5).

EXO (exponent overflow) condition can be determined in parallel with exponent adjustment if the addition generates a carryout and the intermediate exponent has a value of '7F' in hex. This situation can be handled in one cycle including cases in which steps (4) and (5) are combined.

EXU (exponent underflow) condition can be determined only after exponent adjustment. This situation requires two cycles for handling and precludes the combining of steps (4) and (5).

When the operands satisfy certain conditions, one or two of the previously described steps can be skipped. These conditions are listed below:

(1) The fractions are added; the exponents are equal; at least one fraction is normalized. Alignment is not needed, and exponent underflow cannot occur. Step (2) can be eliminated. Steps (4) and (5) can be combined.

(2) The fractions are added; the exponents are equal; the exponent is $>=$'10' hex. Alignment is not needed, and exponent underflow cannot occur. Step (2) can be eliminated. Steps (4) and (5) can be combined.

(3) The fractions are added; the exponents are not equal; first digit of the fraction with the larger exponent is $>=$'1' hex and $<=$'E' hex. Post-normalization is not needed, and exponent underflow cannot occur. Step (4) can be eliminated. Steps (3) and (5) can be combined.

(4) The fractions are subtracted; the exponents are equal; the exponent is $>=$'10' hex. Alignment is not needed, and exponent underflow cannot occur. Step (2) can be eliminated. Steps (4) and (5) can be combined.

(5) The fractions are subtracted; the exponents are not equal; first digit of the fraction with the larger exponent is $>=$'2' hex. Post-normalization is not needed, and exponent underflow cannot occur. Step (4) can be eliminated. Steps (3) and (5) can be combined.

(6) The fractions are added; the exponents are equal; the exponent is $<=$'10' hex; both fractions are not normalized. Alignment is not needed. Step (2) can be eliminated.

(7) The fractions are added; the exponents are not equal; first digit of the fraction with the larger exponent is ='F' hex. Exponent underflow cannot occur. Steps (4) and (5) can be combined.

(8) The fractions are added; the exponents are not equal; the larger exponent is $>=$'10' hex; first digit of the fraction with the larger exponent is ='0' hex. Exponents underflow cannot occur. Steps (4) and (5) can be combined.

(9) The fractions are subtracted; the exponents are equal; the exponent is $<$'10' hex. Alignment is not needed. Step (2) can be eliminated.

(10) The fractions are subtracted; the exponents are not equal; the larger exponent is $>=$'10' hex; first digit of the fraction with the larger exponent is $<$2 hex. Exponent underflow cannot occur. Steps (4) and (5) can be combined.

For conditions (1)–(5), the execution takes only 3 cycles. Conditions (1)–(5) are called Ideal Add Conditions. For conditions (6)–(10), the execution takes only 4 cycles. Conditions (6)–(10) are called Almost Ideal Add Conditions. Conditions other than (1)–(10) are called Non-Ideal Add Conditions and take 5 cycles for execution. Non-ideal Add Conditions can be summarized into conditions (11) and (12) as the following:

(11) The fractions are added, the exponents are not equal; the larger exponent is $<$'10' hex; first digit of the fraction with the larger exponent is equal to '0' hex.

(12) The fractions are subtracted; the exponents are not equal; the larger exponent is $<$'10' hex; first digit of the fraction with the larger exponent is less than '2' hex.

The test for Ideal Add Conditions takes place during cycle 1 of the instruction execution. The detection of the Ideal Add Condition sets the Algorithm Termination condition which will generate the Ending Next Cycle signal set into trigger $T_{15}$ in cycle 2 to inform the IU that the execution will end after cycle 3. (Because of the way that Algorithm Termination works, it is not possible to complete the instruction in less than 3 cycles.) The test for Almost Ideal Add Conditions takes place during cycle 2 of the instruction execution. The Detection of the Almost Ideal Add Condition sets the Algorithm Termination condition which will generate the Ending Next Cycle signal in cycle 3 to inform the IU that the execution will end after cycle 4.

A detailed Add/Subtract Normalized Long algorithm appears in APPENDIX A.

IMPLEMENTATION OF UNNORMALIZED ADDITION AND SUBTRACTION

Because leading zero digits in the result fraction are not shifted out, it is not possible to have an exponent underflow when executing a floating-point unnormalized addition or subtraction. Therefore, implementation of unnormalized floating-point add/subtract takes at most 4 cycles and consists of the first 3 steps described for normalized add/subtract followed by a combination of steps (4) and (5) therefrom. When one of Ideal Add Conditions (1), (2), or (4) is satisfied, step (2) can be eliminated. When one of Ideal Add Conditions (3) and (5) is satisfied, step (3) can be combined with the final step.

Conditions (6) and (9) could also be used to eliminate step (2), but they are not provided in this invention because unnormalized additions and subtractions are not used very frequently. The payoff for performance improvement comes in normalized additions and subtractions and in compares.

IMPLEMENTATION OF FLOATING-POINT COMPARISON

The implementation of floating-point comparison in the FPU 4 consists of the following steps:

(1) Compare the exponents and calculate the alignment shift amount (2) Align the fraction with the smaller exponent.

(3) Add the fractions if signs are different. Subtract the fractions if signs are equal. Recomplement if the result is negative. If adding and there is a carry out, then set the carry-trigger; otherwise, reset the carry-trigger. If subtracting and the result is negative, then recomplement the result and set the recomplement-trigger; otherwise, reset the recomplement-trigger.

(4) Test if the result of the addition or subtraction in step (3) is zero (result is zero and carry-trigger is not set). Determine the sign of the result based on the sign of operand 1, whether operand 1 exponent is larger than operand 2 exponent, whether recomplement-trigger is set, and whether the result is zero. Set the condition code.

The Ideal Add Conditions can also be used to speed up the compare operation. When Ideal Add Conditions (1), (2), or (4) is satisfied, step (2) can be eliminated. When Ideal Add Conditions (3) or (5) is satisfied, steps (3) and (4) can be combined.

Conditions (6) and (9) could as used to eliminate step (2), but they are not provided in this invention because they involve rare situations in which both operands are not normalized or in which the exponent is less than hex 10; these situations are rare in floating-point compare operations.

IMPLEMENTATION OF MULTIPLICATION

The implementation of floating-point multiplication in the FPU 4 without the bypass hardware takes 5 cycles for short operands and 7 cycles for long operands and consists of the following steps:
(1) Load the multiplier (operand 2) fraction into RCDR and into ACCUM 20, 21 bits 56-111. Set up and maintain the multiplicand (operand 1) fraction on RB1.
(2) Multiply the 56-bit operand on RB1 by 56-bit multiplier using the carry-save-add process.
(3) Add the carry and sum using the Absolute Adder 14.
(4) Normalize the fraction and store the result into the result floating-point register.

Steps (2) and (3) each take 2 cycle for short multiplication and 4 cycles for long multiplication, but their execution is overlapped such that step (3) starts while step (2) is in its 2nd cycle of execution.

If one can predict at least 2 cycles before step (4) that the product fraction need not be normalized, then step (4) can be bypassed using the postnormalization bypass hardware. This prediction is made during step (1) by executing a trial multiplication using the leading digit of each operand fraction to see if the 2-digit product has a non-zero value in the first digit. This test requires very little hardware and can be done during step (1). For approximately 78% of the cases involving floating-point multiplication, this test correctly predicts that the product does not need to be normalized. For the remaining cases, the test (sometimes incorrectly) indicates that the product needs to be normalized.

The algorithm for Short Multiply appears in APPENDIX D and illustrates how the postnormalization bypass mechanism is used.

PERFORMANCE IMPROVEMENT

The frequency of occurrence of Ideal Add Conditions in the FPU 4, is believed to be quite high in typical operation. The following assumptions are useful in characterizing the invention;

(1) Operand is normalized at least 99% of the time for normalized add and subtract, for compare, and for multiply.
(2) Operand fractions are added 50% of the time for addition and subtraction instructions. Operand fractions are subtracted 90% of the time for compare instructions.
(3) Operand exponents are equal 10% of the time for add, subtract, and compare.
(4) Exponent value is evenly distributed between '00' hex and '7F' hex.
(5) Leading fraction digit value is evenly distributed between '1' hex and 'F' hex at 6.6%. The probability of 0 leading fraction digit, which is the same as unnormalized fraction, is 1%.

With these assumptions, Ideal Add Conditions are met at least 92.5% of the time and Almost Ideal Add Conditions are met 7% of the time. Execution time for normalized add and subtract will average about 3.08 cycles (an improvement of 62% over 5 cycles), and execution time for compare will average 3.08 cycles (an improvement of 30% over 4 cycles). A normalized product for multiplication can be predicted more than 78% of the time; execution time for short multiply will average about 4.22 cycles (an improvement of 18% over 5 cycles), and execution time for long multiply will average about 6.22 cycles (an improvement of 13% over 7 cycles).

While the invention has been particularly shown and described with reference to preferred embodiments thereof, it will be understood by those skilled in the art that the foregoing and other changes in form and details may be made therein without departing from the spirit and scope of the invention.

APPENDIX A
ADD/SUBTRACT NORMALIZED LONG

ALGORITHM FOR ADD/SUBTRACT NORMALIZED LONG

ADD/SUBTRACT NORMALIZED LONG

MNEMONICS: ADR, SDR, AD, SD
OP CODE: 2A, 2B, 6A, 6B
FORMAT: RR, RR, RX, RX
OPERATION: THE SECOND OPERAND IS ADDED TO (SUBTRACTED FROM) THE
 FIRST OPERAND, AND THE NORMALIZED SUM (DIFFERENCE) IS PLACED
 IN THE FIRST OPERAND LOCATION.
 SUBTRACTION CONSISTS OF INVERTING THE SIGN BIT OF THE SECOND
 OPERAND AND THEN PROCEEDING WITH AN ADDITION.
 ADDITION OF TWO FLOATING-POINT NUMBERS CONSISTS IN CHARACTER-
 ISTIC COMPARISON, FRACTION ALIGNMENT, AND FRACTION ADDITION.
 ONE GUARD DIGIT PARTICIPATES IN THE ALIGNMENT AND ADDITION.
 THE SIGN OF THE SUM IS DETERMINED BY THE RULES OF ALGEBRA,
 UNLESS ALL DIGITS OF THE INTERMEDIATE-SUM FRACTION ARE ZERO,
 IN WHICH CASE THE SIGN IS MADE PLUS.

CONDITION CODE: 0 -- RESULT FRACTION IS ZERO
 1 -- RESULT IS LESS THAN ZERO
 2 -- RESULT IS GREATER THAN ZERO
 3 --

INTERRUPTIONS REPORTED BY F-UNIT: EXPONENT OVERFLOW
EXPONENT UNDERFLOW
SIGNIFICANCE

TIMING: 3 CYCLES USUALLY, 4 OR 5 CYCLES SOMETIMES

FLOW:

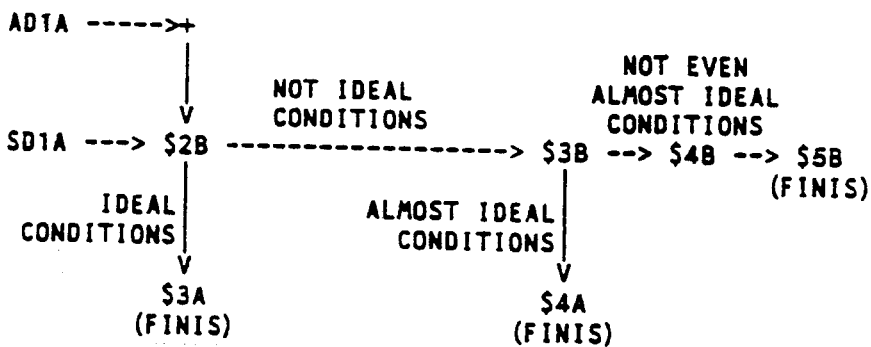

```
                        /* ADR, SDR, AD, SD -- 2A, 2B, 6A, 6B */
BEGIN AD;
CSECT FCSAØ;    ORIGIN 'Ø1'X;

ADR:    LONG_OPERAND -> RB1,
        LONG_OPERAND -> RB2,
        (RB1(8..11) ¬= Ø) -> OP1_NORMAL_TRIGGER,
        (RB2(8..11) ¬= Ø) -> OP2_NORMAL_TRIGGER,
        RA1 -> RA1,
        RA2 -> RA2,
        HOLD_NEXT_CYCLE -> RB_CONTROL,
        (Ø/(-1..Ø),MAX(RB1(1..7),RB2(1..7))/(1..7)) -> EXPR,
        (RB1(1..7) < RB2(1..7)) -> OP2_EXPONENT_LARGER_TRIGGER,
         /* ALIGNMENT HARDWARE USES OP2_EXPONENT_LARGER_TRIGGER */
        LONG -> ALIGNMENT,
        (RB1(1..7) = RB2(1..7)) -> EXPONENTS_EQUAL_TRIGGER,
        MIN(|RB1(1..7) - RB2(1..7)|,31) -> SAR,
        RB1(8..63) -> X_BUS,
        RB2(8..67) -> Y_BUS,
        (X_BUS/(Ø..55),Ø/(56..69)) -> AR,
        (Y_BUS/(Ø..59),Ø/(6Ø..69)) -> BR,
        Ø -> CHECK_XY_BUS_PARITY,
        RB1(Ø) -> SIGN,
        SIGN -> SIGN_TRIGGER,
        RB1(Ø) XOR RB2(Ø) -> SUBTRACT_OPERATION,
        SUBTRACT_OPERATION -> SUBTRACT_TRIGGER,
        IDEAL_ADD_CONDITIONS -> ALGORITHM_TERMINATION,
           /* IF ALGORITHM_TERMINATION IS ACTIVATED,           */
           /*    THEN END THIS ALGORITHM AFTER 3 CYCLES        */
        IDEAL_ADD_CONDITIONS -> IDEAL_CONDITIONS_TRIGGER,
        1 -> TEST_DATA_VALID,
        1 -> LAST_X_CYCLE,
        1 -> BRANCH,
        $2B -> ADDRESS;
                /* ADR, SDR, AD, SD -- 2A, 2B, 6A, 6B */
CSECT FCSAØ;    ORIGIN 'Ø2'X;

SDR:    LONG_OPERAND -> RB1,
        LONG_OPERAND -> RB2,
        (RB1(8..11) ¬= Ø) -> OP1_NORMAL_TRIGGER,
        (RB2(8..11) ¬= Ø) -> OP2_NORMAL_TRIGGER,
```

```
        RA1 -> RA1,
        RA2 -> RA2,
        HOLD_NEXT_CYCLE -> RB_CONTROL,
        (0/(-1..0),MAX(RB1(1..7),RB2(1..7))/(1..7)) -> EXPR,
        (RB1(1..7) < RB2(1..7)) -> OP2_EXPONENT_LARGER_TRIGGER,
         /* ALIGNMENT HARDWARE USES OP2_EXPONENT_LARGER_TRIGGER */
        LONG -> ALIGNMENT,
        (RB1(1..7) = RB2(1..7)) -> EXPONENTS_EQUAL_TRIGGER,
        MIN(|RB1(1..7) - RB2(1..7)|,31) -> SAR,
        RB1(8..63) -> X_BUS,
        RB2(8..67) -> Y_BUS,
        (X_BUS/(0..55),0/(56..69)) -> AR,
        (Y_BUS/(0..59),0/(60..69)) -> BR,
        0 -> CHECK_XY_BUS_PARITY,
        RB1(0) -> SIGN,
        SIGN -> SIGN_TRIGGER,
        RB1(0) XOR ¬RB2(0) -> SUBTRACT_OPERATION,
        SUBTRACT_OPERATION -> SUBTRACT_TRIGGER,
        IDEAL_ADD_CONDITIONS -> ALGORITHM_TERMINATION,
            /* IF ALGORITHM_TERMINATION IS ACTIVATED,        */
            /*     THEN END THIS ALGORITHM AFTER 3 CYCLES    */
        IDEAL_ADD_CONDITIONS -> IDEAL_CONDITIONS_TRIGGER,
        1 -> TEST_DATA_VALID,
        1 -> LAST_X_CYCLE,
        1 -> BRANCH,
        S2B -> ADDRESS;

CSECT FCSB;

S2B:    AUTOMATIC_RECOMPLEMENT -> AA_OPERATION,
        AA_CARRY_OUT -> CARRY_TRIGGER,
        AA_SUM -> ACC,      /* IF EXPONENTS ARE EQUAL, ADDITION */
        0 -> UM,            /*    CAN TAKE PLACE IN THIS CYCLE  */
        ADDER_RECOMPLEMENT -> RECOMPLEMENT_TRIGGER,
        LONG_OPERAND -> RB1,
        LONG_OPERAND -> RB2,
        LONG -> ALIGNMENT,
        ALIGNED_DATA -> X_BUS,  /* IF EXPONENTS UNEQUAL,         */
        ALIGNED_DATA -> Y_BUS,  /* UNSHIFTED FRACTION -> X_BUS   */
                /* IF EXPONENTS EQUAL, OP1 FRACTION -> X_BUS */
        (X_BUS/(0..55),0/(56..69)) -> AR,
        (Y_BUS/(0..59),0/(60..69)) -> BR,
        (EXPR = '7F'X) -> EXPR_EQUAL_7F_TRIGGER,
        ALMOST_IDEAL_ADD_CONDITIONS -> ALGORITHM_TERMINATION,
            /* IF ALGORITHM_TERMINATION IS ACTIVATED,        */
            /*     THEN END THIS ALGORITHM AFTER 4 CYCLES    */
        ALMOST_IDEAL_ADD_CONDITIONS
                                -> IDEAL_CONDITIONS_TRIGGER,
        /* UNDER HARD-WIRED CONTROL, ENDING_NEXT_CYCLE SIGNAL    */
        /* IS ACTIVATED IF ALGORITHM_TERMINATION WAS ACTIVE      */
        /* LAST CYCLE                                            */
        1 -> TEST_DATA_VALID,
        IDEAL_CONDITIONS_TRIGGER -> BRANCH,
        S3A -> ADDRESS:
                        /* ADR, SDR, AD, SD -- 2A, 2B, 6A, 6B */

CSECT FCSA1;

S3A:    (EXPONENTS_EQUAL_TRIGGER
                        & (RECOMPLEMENT_TRIGGER XOR SIGN_TRIGGER))
        | (OP2_EXPONENT_LARGER_TRIGGER
                        & (SUBTRACT_TRIGGER XOR SIGN_TRIGGER))
        | (¬EXPONENTS_EQUAL_TRIGGER
          & ¬OP2_EXPONENT_LARGER_TRIGGER & SIGN_TRIGGER) -> SIGN,
        (PREV_CYCLE_SUM=0) & EXPONENTS_EQUAL_TRIGGER
                                & ¬CARRY_TRIGGER -> ZERO_TEST,
            /* IN THE LINES THAT FOLLOW, NOTE THAT EXPR(-1) = 0 */
        ZERO_TEST | (EXPR(-1) & ¬EXU_MASK) -> CC0_TRIGGER,
        SIGN & ¬ZERO_TEST & (EXU_MASK | ¬EXPR(-1)) -> CC1_TRIGGER,
        AUTOMATIC_RECOMPLEMENT -> AA_OPERATION,
        SIGN & ¬ZERO_TEST & (EXU_MASK | ¬EXPR(-1))
                                        -> WRITE_BUS_SIGN,
```

```
      IF ((ZERO_TEST & ¬SIGNIFICANCE_MASK)
         | (EXPR(-1) & ¬EXU_MASK))
            THEN 0
         ELSE IF EXPONENTS_EQUAL_TRIGGER
            & (CARRY_TRIGGER | ¬(PREV_CYCLE_SUM=0))
            THEN EXPONENT_CALCULATION(1..7)
            ELSE EXPR(1..7) ENDF -> WRITE_BUS_EXP,
      IF (ZERO_TEST | (EXPR(-1) & ¬EXU_MASK)) THEN 0
         ELSE IF EXPONENTS_EQUAL_TRIGGER THEN PN_SHIFTER
         ELSE AA_SUM(0..59) ENDF -> WRITE_BUS_FRACTION,
      LEADING_ZERO_DIGIT_COUNT -> NORMALIZE_COUNT,
      IF CARRY_TRIGGER THEN RIGHT 1 ELSE LEFT
         LEADING_ZERO_DIGIT_COUNT ENDF -> NORMALIZE_SHIFT_AMOUNT,
      IF CARRY_TRIGGER THEN EXPR + 1 ELSE EXPR - NORMALIZE_COUNT
                              ENDF -> EXPONENT_CALCULATION,
      AA_SUM -> ACC,        /* NECESSARY FOR RESIDUE CHECKING */
      0 -> UM,
      OP1AR -> WRITE_ADDRESS,
      LONG -> WRITE_LENGTH,
      1 -> RESET_RETRY_POINT,
      EXPONENTS_EQUAL_TRIGGER & CARRY_TRIGGER
                     & EXPR_EQUAL_7F_TRIGGER -> EXO_INTERRUPT,
      EXPR(-1) & EXU_MASK & ¬ZERO_TEST -> EXU_INTERRUPT,
      ZERO_TEST & SIGNIFICANCE_MASK -> SIGNIFICANCE_INTERRUPT,
            /* ADR, SDR, AD, SD -- 2A, 2B, 6A, 6B */

0 -> CHECK_RB2_PARITY,
      R1 -> OP1AR,
      R2 -> OP2AR,
      R1 -> RA1,
      R2 -> RA2,
      0 -> SAR,
      1 -> LAST_X_CYCLE,
      1 -> BRANCH,
      IDLE_LOOP_B -> ADDRESS;
CSECT FCSB;

$3B: AUTOMATIC_RECOMPLEMENT -> AA_OPERATION,
     AA_CARRY_OUT -> CARRY_TRIGGER,
     AA_SUM -> ACC,
     0 -> UM,
     ADDER_RECOMPLEMENT -> RECOMPLEMENT_TRIGGER,
     (EXPONENTS_EQUAL_TRIGGER
           & (RECOMPLEMENT_TRIGGER XOR SIGN_TRIGGER))
        | (OP2_EXPONENT_LARGER_TRIGGER
           & (SUBTRACT_TRIGGER XOR SIGN_TRIGGER))
        | (¬EXPONENTS_EQUAL_TRIGGER
           & ¬OP2_EXPONENT_LARGER_TRIGGER & SIGN_TRIGGER) -> SIGN,
     SIGN -> SIGN_TRIGGER,
     LEADING_ZERO_DIGIT_COUNT -> NORMALIZE_COUNT,
     IF CARRY_TRIGGER THEN EXPR + 1 ELSE EXPR - NORMALIZE_COUNT
                             ENDF -> EXPONENT_CALCULATION,
     IF (¬EXPONENTS_EQUAL_TRIGGER | ¬IDEAL_CONDITIONS_TRIGGER
               | ((PREV_CYCLE_SUM=0) & ¬CARRY_TRIGGER))
         THEN EXPR ELSE EXPONENT_CALCULATION ENDF -> EXPR,
     0 -> CHECK_RB2_PARITY,
     /* UNDER HARD-WIRED CONTROL, ENDING_NEXT_CYCLE SIGNAL    */
     /* IS ACTIVATED IF ALGORITHM_TERMINATION WAS ACTIVE      */
     /* LAST CYCLE                                            */
```

```
            IDEAL_CONDITIONS_TRIGGER -> BRANCH,
        $4A -> ADDRESS;
              /* ADR, SDR, AD, SD -- 2A, 2B, 6A, 6B */

CSECT FCSA1;

$4A:    (EXPONENTS_EQUAL_TRIGGER & SIGN_TRIGGER)
            | (¬EXPONENTS_EQUAL_TRIGGER
                & (RECOMPLEMENT_TRIGGER XOR SIGN_TRIGGER)) -> SIGN,
        (PREV_CYCLE_SUM=0) & ¬CARRY_TRIGGER -> ZERO_TEST,
        ZERO_TEST | (EXPR(-1) & ¬EXU_MASK) -> CC0_TRIGGER,
        SIGN & ¬ZERO_TEST & (EXU_MASK | ¬EXPR(-1)) -> CC1_TRIGGER,
        LEADING_ZERO_DIGIT_COUNT -> NORMALIZE_COUNT,
        IF CARRY_TRIGGER THEN RIGHT 1 ELSE LEFT
            LEADING_ZERO_DIGIT_COUNT ENDF -> NORMALIZE_SHIFT_AMOUNT,
        IF CARRY_TRIGGER THEN EXPR + 1 ELSE EXPR - NORMALIZE_COUNT
                             ENDF -> EXPONENT_CALCULATION,
        SIGN & ¬ZERO_TEST & (EXU_MASK | ¬EXPR(-1))
                                      -> WRITE_BUS_SIGN,
        IF ((ZERO_TEST & ¬SIGNIFICANCE_MASK)
            | (EXPR(-1) & ¬EXU_MASK))
              THEN 0
            ELSE IF EXPONENTS_EQUAL_TRIGGER |
                ((PREV_CYCLE_SUM=0) & ¬CARRY_TRIGGER)
              THEN EXPR(1..7)
            ELSE EXPONENT_CALCULATION(1..7) ENDF -> WRITE_BUS_EXP,
        IF (ZERO_TEST | (EXPR(-1) & ¬EXU_MASK))
              THEN 0 ELSE PN_SHIFTER ENDF -> WRITE_BUS_FRACTION,
        OP1AR -> WRITE_ADDRESS,
        LONG -> WRITE_LENGTH,
        1 -> RESET_RETRY_POINT,
        CARRY_TRIGGER & EXPR_EQUAL_7F_TRIGGER -> EXO_INTERRUPT,
        EXPR(-1) & EXU_MASK & ¬ZERO_TEST -> EXU_INTERRUPT,
        ZERO_TEST & SIGNIFICANCE_MASK -> SIGNIFICANCE_INTERRUPT,
        0 -> CHECK_RB2_PARITY,
        R1 -> OP1AR,
        R2 -> OP2AR,
        R1 -> RA1,
        R2 -> RA2,
        0 -> SAR,
        1 -> LAST_X_CYCLE,
        1 -> BRANCH,
        IDLE_LOOP_B -> ADDRESS;

CSECT FCSB; /* EXPONENTS UNEQUAL, CONDITIONS TOTALLY NOT IDEAL*/

$4B:    (EXPONENTS_EQUAL_TRIGGER & SIGN_TRIGGER)
            | (¬EXPONENTS_EQUAL_TRIGGER
                & (RECOMPLEMENT_TRIGGER XOR SIGN_TRIGGER)) -> SIGN,
        SIGN -> SIGN_TRIGGER,
        (PREV_CYCLE_SUM=0) & ¬CARRY_TRIGGER -> ZERO_TEST,
        ZERO_TEST -> ZERO_TRIGGER,
        LEADING_ZERO_DIGIT_COUNT -> NORMALIZE_COUNT,
        IF CARRY_TRIGGER THEN EXPR + 1 ELSE EXPR - NORMALIZE_COUNT
                             ENDF -> EXPONENT_CALCULATION,
        IF (PREV_CYCLE_SUM=0) & ¬CARRY_TRIGGER
              THEN EXPR ELSE EXPONENT_CALCULATION ENDF -> EXPR,
        HOLD -> SUM_ZERO_DIGIT_TEST,
        ACC -> ACC,
        CARRY_TRIGGER -> CARRY_TRIGGER,
        0 -> CHECK_RB2_PARITY,
        1 -> ENDING_NEXT_CYCLE;
              /* ADR, SDR, AD, SD -- 2A, 2B, 6A, 6B */

$5B:    SIGN_TRIGGER -> SIGN,
        ZERO_TRIGGER -> ZERO_TEST,
        ZERO_TEST | (EXPR(-1) & ¬EXU_MASK) -> CC0_TRIGGER,
        SIGN & ¬ZERO_TEST & ¬(EXPR(-1) & ¬EXU_MASK)
                                      -> CC1_TRIGGER,
        IF CARRY_TRIGGER THEN RIGHT 1 ELSE LEFT
            LEADING_ZERO_DIGIT_COUNT ENDF -> NORMALIZE_SHIFT_AMOUNT,
        SIGN & ¬ZERO_TEST & (EXU_MASK | ¬EXPR(-1))
                                      -> WRITE_BUS_SIGN,
        IF ((ZERO_TEST & ¬SIGNIFICANCE_MASK)
            | (EXPR(-1) & ¬EXU_MASK))
              THEN 0 ELSE EXPR(1..7) ENDF -> WRITE_BUS_EXP,
```

```
    IF (ZERO_TEST | (EXPR(-1) & ¬EXU_MASK))
        THEN 0 ELSE PN_SHIFTER ENDF -> WRITE_BUS_FRACTION,
CARRY_TRIGGER & EXPR_EQUAL_7F_TRIGGER -> EXO_INTERRUPT,
EXPR(-1) & EXU_MASK & ¬ZERO_TEST -> EXU_INTERRUPT,
ZERO_TEST & SIGNIFICANCE_MASK -> SIGNIFICANCE_INTERRUPT,
OP1AR -> WRITE_ADDRESS,
LONG -> WRITE_LENGTH,
1 -> RESET_RETRY_POINT,
0 -> CHECK_RB2_PARITY,
R1 -> OP1AR,
R2 -> OP2AR,
R1 -> RA1,
R2 -> RA2,
0 -> SAR,
1 -> LAST_X_CYCLE,
1 -> BRANCH,
IDLE_LOOP_A -> ADDRESS;

ENDB AD;
```

APPENDIX B
ADD/SUBTRACT UNNORMALIZED SHORT

ALGORITHM FOR ADD/SUBTRACT UNNORMALIZED SHORT

/* AUR, SUR, AU, SU -- 3E, 3F, 7E, 7F */

ADD/SUBTRACT UNNORMALIZED SHORT

MNEMONICS: AUR, SUR, AU, SU
OP CODE: 3E, 3F, 7E, 7F
FORMAT: RR, RR, RX, RX
OPERATION: THE SECOND OPERAND IS ADDED TO (SUBTRACTED FROM) THE FIRST OPERAND, AND THE UNNORMALIZED SUM (DIFFERENCE) IS PLACED IN THE FIRST-OPERAND LOCATION.

SUBTRACTION CONSISTS OF INVERTING THE SIGN BIT OF THE SECOND OPERAND AND THEN PROCEEDING WITH AN ADDITION.

THE EXECUTION OF ADD UNNORMALIZED IS IDENTICAL TO THAT OF ADD NORMALIZED EXCEPT THAT:

1. WHEN NO CARRY IS PRESENT AFTER THE ADDITION, THE INTERMEDIATE-SUM FRACTION IS TRUNCATED TO THE PROPER RESULT-FRACTION LENGTH WITHOUT A LEFT SHIFT TO ELIMINATE LEADING HEXADECIMAL ZEROS AND WITHOUT THE CORRESPONDING REDUCTION OF THE CHARACTERISTIC.

2. EXPONENT UNDERFLOW CANNOT OCCUR.

3. THE GUARD DIGIT DOES NOT PARTICIPATE IN THE RECOGNITION OF A ZERO RESULT FRACTION. A ZERO RESULT FRACTION IS RECOGNIZED WHEN THE FRACTION, THAT IS, THE INTERMEDIATE-SUM FRACTION, EXCLUDING THE GUARD DIGIT, IS ZERO.

CONDITION CODE: 0 -- RESULT FRACTION IS ZERO
1 -- RESULT IS LESS THAN ZERO
2 -- RESULT IS GREATER THAN ZERO
3 --

INTERRUPTIONS REPORTED BY F-UNIT: EXPONENT OVERFLOW
SIGNIFICANCE

TIMING: 3 CYCLES USUALLY, 4 CYCLES SOMETIMES

FLOW:

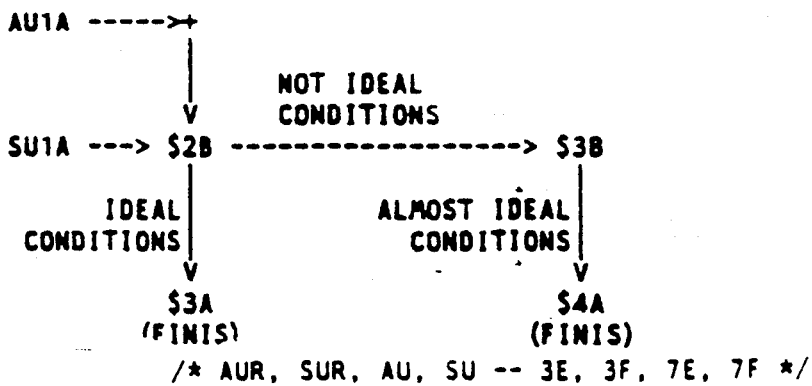

```
                    /* AUR, SUR, AU, SU -- 3E, 3F, 7E, 7F */
BEGIN AU;
CSECT FCSA0;    ORIGIN '05'X;

AUR:    SHORT_OPERAND -> RB1,
        SHORT_OPERAND -> RB2,
        (RB1(8..11) ¬= 0) -> OP1_NORMAL_TRIGGER,
        (RB2(8..11) ¬= 0) -> OP2_NORMAL_TRIGGER,
        RA1 -> RA1,
        RA2 -> RA2,
        HOLD_NEXT_CYCLE -> RB_CONTROL,
        (0/(-1..0),MAX(RB1(1..7),RB2(1..7))/(1..7)) -> EXPR,
        (RB1(1..7) < RB2(1..7)) -> OP2_EXPONENT_LARGER_TRIGGER,
         /* ALIGNMENT HARDWARE USES OP2_EXPONENT_LARGER_TRIGGER */
        SHORT -> ALIGNMENT,
        (RB1(1..7) = RB2(1..7)) -> EXPONENTS_EQUAL_TRIGGER,
        MIN(|RB1(1..7) - RB2(1..7)|,31) -> SAR,
        RB1(8..63) -> X_BUS,
        RB2(8..67) -> Y_BUS,
        (X_BUS/(0..55),0/(56..69)) -> AR,
        (Y_BUS/(0..59),0/(60..69)) -> BR,
        0 -> CHECK_XY_BUS_PARITY,
        RB1(0) -> SIGN,
        SIGN -> SIGN_TRIGGER,
        RB1(0) XOR RB2(0) -> SUBTRACT_OPERATION,
        SUBTRACT_OPERATION -> SUBTRACT_TRIGGER,
        IDEAL_ADD_CONDITIONS -> ALGORITHM_TERMINATION,
           /* IF ALGORITHM_TERMINATION IS ACTIVATED,            */
           /*     THEN END THIS ALGORITHM AFTER 3 CYCLES         */
        IDEAL_ADD_CONDITIONS -> IDEAL_CONDITIONS_TRIGGER,
        1 -> TEST_DATA_VALID,
        1 -> LAST_X_CYCLE,
        1 -> BRANCH,
        $2B -> ADDRESS;
                /* AUR, SUR, AU, SU -- 3E, 3F, 7E, 7F */
CSECT FCSA0;    ORIGIN '06'X;

SUR:    SHORT_OPERAND -> RB1,
        SHORT_OPERAND -> RB2,
        (RB1(8..11) ¬= 0) -> OP1_NORMAL_TRIGGER,
        (RB2(8..11) ¬= 0) -> OP2_NORMAL_TRIGGER,
```

```
        RA1 -> RA1,
        RA2 -> RA2,
        HOLD_NEXT_CYCLE -> RB_CONTROL,
        (0/(-1..0),MAX(RB1(1..7),RB2(1..7))/(1..7)) -> EXPR,
        (RB1(1..7) < RB2(1..7)) -> OP2_EXPONENT_LARGER_TRIGGER,
         /* ALIGNMENT HARDWARE USES OP2_EXPONENT_LARGER_TRIGGER */
        SHORT -> ALIGNMENT,
        (RB1(1..7) = RB2(1..7)) -> EXPONENTS_EQUAL_TRIGGER,
        MIN(|RB1(1..7) - RB2(1..7)|,31) -> SAR,
        RB1(8..63) -> X_BUS,
        RB2(8..67) -> Y_BUS,
        (X_BUS/(0..55),0/(56..69)) -> AR,
        (Y_BUS/(0..59),0/(60..69)) -> BR,
        0 -> CHECK_XY_BUS_PARITY,
        RB1(0) -> SIGN,
        SIGN -> SIGN_TRIGGER,
        RB1(0) XOR ¬RB2(0) -> SUBTRACT_OPERATION,
        SUBTRACT_OPERATION -> SUBTRACT_TRIGGER,
        IDEAL_ADD_CONDITIONS -> ALGORITHM_TERMINATION,
             /* IF ALGORITHM_TERMINATION IS ACTIVATED,         */
             /*     THEN END THIS ALGORITHM AFTER 3 CYCLES     */
        IDEAL_ADD_CONDITIONS -> IDEAL_CONDITIONS_TRIGGER,
        1 -> TEST_DATA_VALID,
        1 -> LAST_X_CYCLE,
        1 -> BRANCH,
        S2B -> ADDRESS;

CSECT FCSB;

S2B:    AUTOMATIC_RECOMPLEMENT -> AA_OPERATION,
        AA_CARRY_OUT -> CARRY_TRIGGER,
        AA_SUM -> ACC,      /* IF EXPONENTS ARE EQUAL, ADDITION */
        0 -> UM,            /*    CAN TAKE PLACE IN THIS CYCLE  */
        ADDER_RECOMPLEMENT -> RECOMPLEMENT_TRIGGER,
        SHORT_OPERAND -> RB1,
        SHORT_OPERAND -> RB2,
        SUM(0..23) -> NEXT_CYCLE_ZERO_TEST,
        SHORT -> ALIGNMENT,
        ALIGNED_DATA -> X_BUS,  /* IF EXPONENTS UNEQUAL,       */
        ALIGNED_DATA -> Y_BUS,  /* UNSHIFTED FRACTION -> X_BUS */
             /* IF EXPONENTS EQUAL, OP1 FRACTION -> X_BUS */
        (X_BUS/(0..55),0/(56..69)) -> AR,
        (Y_BUS/(0..59),0/(60..69)) -> BR,
        (EXPR = '7F'X) -> EXPR_EQUAL_7F_TRIGGER,
        ALMOST_IDEAL_ADD_CONDITIONS -> ALGORITHM_TERMINATION,
             /* IF ALGORITHM_TERMINATION IS ACTIVATED,         */
             /*     THEN END THIS ALGORITHM AFTER 4 CYCLES     */
        ALMOST_IDEAL_ADD_CONDITIONS
                              -> IDEAL_CONDITIONS_TRIGGER,
        /* UNDER HARD-WIRED CONTROL, ENDING_NEXT_CYCLE SIGNAL  */
        /* IS ACTIVATED IF ALGORITHM_TERMINATION WAS ACTIVE    */
        /* LAST CYCLE                                          */
        1 -> TEST_DATA_VALID,
        IDEAL_CONDITIONS_TRIGGER -> BRANCH,
        S3A -> ADDRESS;

/* AUR, SUR, AU, SU -- 3E, 3F, 7E, 7F */

CSECT FCSA1;

S3A:    (EXPONENTS_EQUAL_TRIGGER
                       & (RECOMPLEMENT_TRIGGER XOR SIGN_TRIGGER))
         | (OP2_EXPONENT_LARGER_TRIGGER
                       & (SUBTRACT_TRIGGER XOR SIGN_TRIGGER))
         | (¬EXPONENTS_EQUAL_TRIGGER
                       & ¬OP2_EXPONENT_LARGER_TRIGGER
                                  & SIGN_TRIGGER) -> SIGN,
        (PREV_CYCLE_SUM=0) & EXPONENTS_EQUAL_TRIGGER
                                  & ¬CARRY_TRIGGER -> ZERO_TEST,
           /* IN THE LINES THAT FOLLOW, NOTE THAT EXPR(-1) = 0 */
        ZERO_TEST | (EXPR(-1) & ¬EXU_MASK) -> CC0_TRIGGER,
        SIGN & ¬ZERO_TEST & (EXU_MASK | ¬EXPR(-1)) -> CC1_TRIGGER,
        AUTOMATIC_RECOMPLEMENT -> AA_OPERATION,
        SIGN & ¬ZERO_TEST & (EXU_MASK | ¬EXPR(-1))
                                  -> WRITE_BUS_SIGN,
```

```
        IF ((ZERO_TEST & ¬SIGNIFICANCE_MASK)
          | (EXPR(-1) & ¬EXU_MASK))
              THEN 0
            ELSE IF EXPONENTS_EQUAL_TRIGGER
                & (CARRY_TRIGGER | ¬(PREV_CYCLE_SUM=0))
                THEN EXPONENT_CALCULATION(1..7)
                ELSE EXPR(1..7) ENDF -> WRITE_BUS_EXP,
        IF (ZERO_TEST | (EXPR(-1) & ¬EXU_MASK)) THEN 0
            ELSE IF EXPONENTS_EQUAL_TRIGGER THEN PN_SHIFTER
            ELSE AA_SUM(0..59) ENDF -> WRITE_BUS_FRACTION,
        0 -> NORMALIZE_COUNT,
        IF CARRY_TRIGGER THEN RIGHT 1 ELSE 0 ENDF
                                        -> NORMALIZE_SHIFT_AMOUNT,
        IF CARRY_TRIGGER THEN EXPR + 1 ELSE EXPR - NORMALIZE_COUNT
                                ENDF -> EXPONENT_CALCULATION,
        OP1AR -> WRITE_ADDRESS,
        SHORT -> WRITE_LENGTH,
        1 -> RESET_RETRY_POINT,
        AA_SUM -> ACC,         /* NECESSARY FOR RESIDUE CHECKING */
        0 -> UM,
        EXPONENTS_EQUAL_TRIGGER & CARRY_TRIGGER
                        & EXPR_EQUAL_7F_TRIGGER -> EXO_INTERRUPT,
        EXPR(-1) & EXU_MASK & ¬ZERO_TEST -> EXU_INTERRUPT,
        ZERO_TEST & SIGNIFICANCE_MASK -> SIGNIFICANCE_INTERRUPT,
                /* AUR, SUR, AU, SU -- 3E, 3F, 7E, 7F */
        0 -> CHECK_RB2_PARITY,
        R1 -> OP1AR,
        R2 -> OP2AR,
        R1 -> RA1,
        R2 -> RA2,
        0 -> SAR,
        1 -> LAST_X_CYCLE,
        1 -> BRANCH,
        IDLE_LOOP_B -> ADDRESS;

CSECT FCSB;

$3B:    AUTOMATIC_RECOMPLEMENT -> AA_OPERATION,
        AA_CARRY_OUT -> CARRY_TRIGGER,
        AA_SUM -> ACC,
        0 -> UM,
        ADDER_RECOMPLEMENT -> RECOMPLEMENT_TRIGGER,
        (EXPONENTS_EQUAL_TRIGGER
                & (RECOMPLEMENT_TRIGGER XOR SIGN_TRIGGER))
            | (OP2_EXPONENT_LARGER_TRIGGER
                & (SUBTRACT_TRIGGER XOR SIGN_TRIGGER))
            | (¬EXPONENTS_EQUAL_TRIGGER
            & ¬OP2_EXPONENT_LARGER_TRIGGER & SIGN_TRIGGER) -> SIGN,
        SIGN -> SIGN_TRIGGER,
        SUM(0..23) -> NEXT_CYCLE_ZERO_TEST,
        0 -> CHECK_RB2_PARITY,
        1 -> ENDING_NEXT_CYCLE,
        1 -> BRANCH,
        $4A -> ADDRESS;
                /* AUR, SUR, AU, SU -- 3E, 3F, 7E, 7F */

CSECT FCSA1;
```

```
        /* NOTE: EXPR(-1) IS ALWAYS ZERO IN THIS ALGORITHM */
S4A:  (EXPONENTS_EQUAL_TRIGGER & SIGN_TRIGGER)
      | (¬EXPONENTS_EQUAL_TRIGGER
           & (RECOMPLEMENT_TRIGGER XOR SIGN_TRIGGER)) -> SIGN,
      (PREV_CYCLE_SUM=0) & ¬CARRY_TRIGGER -> ZERO_TEST,
      ZERO_TEST | (EXPR(-1) & ¬EXU_MASK) -> CC0_TRIGGER,
      SIGN & ¬ZERO_TEST & (EXU_MASK | ¬EXPR(-1)) -> CC1_TRIGGER,
      0 -> NORMALIZE_COUNT,
      IF CARRY_TRIGGER THEN RIGHT 1 ELSE 0 ENDF
                                             -> NORMALIZE_SHIFT_AMOUNT,
      IF CARRY_TRIGGER THEN EXPR + 1 ELSE EXPR - NORMALIZE_COUNT
                                  ENDF -> EXPONENT_CALCULATION,
      SIGN & ¬ZERO_TEST & (EXU_MASK | ¬EXPR(-1))
                                             -> WRITE_BUS_SIGN,
      IF ((ZERO_TEST & ¬SIGNIFICANCE_MASK)
         | (EXPR(-1) & ¬EXU_MASK))
         THEN 0
         ELSE EXPONENT_CALCULATION(1..7) ENDF -> WRITE_BUS_EXP,
      IF (ZERO_TEST | (EXPR(-1) & ¬EXU_MASK))
         THEN 0 ELSE PN_SHIFTER ENDF -> WRITE_BUS_FRACTION,
      OP1AR -> WRITE_ADDRESS,
      SHORT -> WRITE_LENGTH,
      1 -> RESET_RETRY_POINT,
      CARRY_TRIGGER & EXPR_EQUAL_7F_TRIGGER -> EXO_INTERRUPT,
      EXPR(-1) & EXU_MASK & ¬ZERO_TEST -> EXU_INTERRUPT,
      /* EXU_INTERRUPT WILL NOT HAPPEN HERE */
      ZERO_TEST & SIGNIFICANCE_MASK -> SIGNIFICANCE_INTERRUPT,
      0 -> CHECK_RB2_PARITY,
      R1 -> OP1AR,
      R2 -> OP2AR,
      R1 -> RA1,
      R2 -> RA2,
      0 -> SAR,
      1 -> LAST_X_CYCLE,
      1 -> BRANCH,
      IDLE_LOOP_B -> ADDRESS;

ENDB AU;
```

APPENDIX C
COMPARE LONG

ALGORITHM FOR COMPARE LONG

/* CDR, CD -- 29, 69 */

COMPARE LONG

MNEMONICS: CDR, CD
OP CODE: 29, 69
FORMAT: RR, RX
OPERATION: THE FIRST OPERAND IS COMPARED WITH THE SECOND
OPERAND, AND THE CONDITION CODE IS SET TO INDICATE THE
RESULT.

THE COMPARISON IS ALGEBRAIC AND FOLLOWS THE PROCEDURE FOR
NORMALIZED FLOATING-POINT SUBTRACTION, EXCEPT THAT THE
DIFFERENCE IS DISCARDED AFTER SETTING THE CONDITION CODE AND
BOTH OPERANDS REMAIN UNCHANGED. WHEN THE DIFFERENCE,
INCLUDING THE GUARD DIGIT, IS ZERO, THE OPERANDS ARE EQUAL.

WHEN A NONZERO DIFFERENCE IS POSITIVE OR NEGATIVE, THE FIRST
OPERAND IS HIGH OR LOW, RESPECTIVELY.

AN EXPONENT-OVERFLOW, EXPONENT-UNDERFLOW, OR SIGNIFICANCE
EXCEPTION CANNOT OCCUR.

CONDITION CODE:  0 -- OPERANDS ARE EQUAL
                 1 -- FIRST OPERAND IS LOW
                 2 -- FIRST OPERAND IS HIGH
                 3 --

INTERRUPTIONS REPORTED BY F-UNIT:  NONE

TIMING:  3 CYCLES USUALLY, 4 CYCLES SOMETIMES

```
FLOW:               NOT IDEAL
                    CONDITIONS
   CD1A -----> $2B ------------> $3B ---> $4B
                |                         (FINIS)
        IDEAL   |
     CONDITIONS |
                V
               $3A
            (FINIS)

/* CDR, CD -- 29, 69 */

BEGIN CD;

CSECT FCSA0;   ORIGIN '09'X;

CDR:  LONG_OPERAND -> RB1,
      LONG_OPERAND -> RB2,
      (RB1(8..11) ¬= 0) -> OP1_NORMAL_TRIGGER,
      (RB2(8..11) ¬= 0) -> OP2_NORMAL_TRIGGER,
      RA1 -> RA1,
      RA2 -> RA2,
      HOLD_NEXT_CYCLE -> RB_CONTROL,
      (0/(-1..0),MAX(RB1(1..7),RB2(1..7))/(1..7)) -> EXPR,
      (RB1(1..7) < RB2(1..7)) -> OP2_EXPONENT_LARGER_TRIGGER,
      /* ALIGNMENT HARDWARE USES OP2_EXPONENT_LARGER_TRIGGER */
      LONG -> ALIGNMENT,
      (RB1(1..7) = RB2(1..7)) -> EXPONENTS_EQUAL_TRIGGER,
      MIN(|RB1(1..7) - RB2(1..7)|,31) -> SAR,
      RB1(8..63) -> X_BUS,
      RB2(8..67) -> Y_BUS,
      (X_BUS/(0..55),0/(56..69)) -> AR,
      (Y_BUS/(0..59),0/(60..69)) -> BR,
      0 -> CHECK_XY_BUS_PARITY,
      RB1(0) -> SIGN,
      SIGN -> SIGN_TRIGGER,
      RB1(0) XOR ¬RB2(0) -> SUBTRACT_OPERATION,
      SUBTRACT_OPERATION -> SUBTRACT_TRIGGER,
      IDEAL_ADD_CONDITIONS -> ALGORITHM_TERMINATION,
      IDEAL_ADD_CONDITIONS -> IDEAL_CONDITIONS_TRIGGER,
      1 -> TEST_DATA_VALID,
      1 -> LAST_X_CYCLE,
      1 -> BRANCH,
      $2B -> ADDRESS;
```

```
/* CDR, CD -- 29, 69 */
```

CSECT FCSB;

S2B: AUTOMATIC_RECOMPLEMENT -> AA_OPERATION,
     AA_CARRY_OUT -> CARRY_TRIGGER,
     AA_SUM -> ACC,    /* IF EXPONENTS ARE EQUAL, FRACTION      */
     Ø -> UM,          /*    COMPARISON CAN TAKE PLACE THIS CYCLE */
     ADDER_RECOMPLEMENT -> RECOMPLEMENT_TRIGGER,
     LONG_OPERAND -> RB1,
     LONG_OPERAND -> RB2,
     LONG -> ALIGNMENT,
     ALIGNED_DATA -> X_BUS,  /* IF EXPONENTS UNEQUAL,        */
     ALIGNED_DATA -> Y_BUS,  /* UNSHIFTED FRACTION -> X_BUS  */
            /* IF EXPONENTS EQUAL, OP1 FRACTION -> X_BUS */
     (X_BUS/(Ø..55),Ø/(56..69)) -> AR,
     (Y_BUS/(Ø..59),Ø/(60..69)) -> BR,
     /* UNDER HARD-WIRED CONTROL, ENDING_NEXT_CYCLE SIGNAL    */
     /* IS ACTIVATED IF ALGORITHM_TERMINATION WAS ACTIVE      */
     /* LAST CYCLE                                            */
     1 -> TEST_DATA_VALID,
     IDEAL_CONDITIONS_TRIGGER -> BRANCH,
     S3A -> ADDRESS;

CSECT FCSA1;

S3A: (EXPONENTS_EQUAL_TRIGGER
                 & (RECOMPLEMENT_TRIGGER XOR SIGN_TRIGGER))
      | (OP2_EXPONENT_LARGER_TRIGGER
                 & (SUBTRACT_TRIGGER XOR SIGN_TRIGGER))
      | (¬EXPONENTS_EQUAL_TRIGGER
                 & ¬OP2_EXPONENT_LARGER_TRIGGER
                              & SIGN_TRIGGER) -> SIGN,
     (PREV_CYCLE_SUM=Ø) & EXPONENTS_EQUAL_TRIGGER
                              & ¬CARRY_TRIGGER -> ZERO_TEST,
     ZERO_TEST | (EXPR(-1) & ¬EXU_MASK) -> CCØ_TRIGGER,
     SIGN & ¬ZERO_TEST & (EXU_MASK | ¬EXPR(-1)) -> CC1_TRIGGER,
          /* NOTE THAT EXPR(-1) = Ø IN THIS SITUATION */
     Ø -> CHECK_RB2_PARITY,
     R1 -> OP1AR,
     R2 -> OP2AR,
     R1 -> RA1,
     R2 -> RA2,
     Ø -> SAR,
     1 -> RESET_RETRY_POINT,
     1 -> LAST_X_CYCLE,
     1 -> BRANCH,
     IDLE_LOOP_B -> ADDRESS;

```
/* CDR, CD -- 29, 69 */
```

CSECT FCSB;

S3B: AUTOMATIC_RECOMPLEMENT -> AA_OPERATION,
     AA_CARRY_OUT -> CARRY_TRIGGER,
     AA_SUM -> ACC,
     Ø -> UM,

```
      ADDER_RECOMPLEMENT -> RECOMPLEMENT_TRIGGER,
      (EXPONENTS_EQUAL_TRIGGER
            & (RECOMPLEMENT_TRIGGER XOR SIGN_TRIGGER))
       | (OP2_EXPONENT_LARGER_TRIGGER
            & (SUBTRACT_TRIGGER XOR SIGN_TRIGGER))
       | (¬EXPONENTS_EQUAL_TRIGGER
            & ¬OP2_EXPONENT_LARGER_TRIGGER & SIGN_TRIGGER) -> SIGN,
      SIGN -> SIGN_TRIGGER,
      Ø -> CHECK_RB2_PARITY,
      1 -> ENDING_NEXT_CYCLE;

$4B:  (EXPONENTS_EQUAL_TRIGGER & SIGN_TRIGGER)
        | (¬EXPONENTS_EQUAL_TRIGGER
            & (RECOMPLEMENT_TRIGGER XOR SIGN_TRIGGER)) -> SIGN,
      (PREV_CYCLE_SUM=Ø) & ¬CARRY_TRIGGER -> ZERO_TEST,
      ZERO_TEST | (EXPR(-1) & ¬EXU_MASK) -> CCØ_TRIGGER,
      SIGN & ¬ZERO_TEST & (EXU_MASK | ¬EXPR(-1)) -> CC1_TRIGGER,
          /* NOTE:  EXPR(-1) IS ZERO IN THIS SITUATION */
      Ø -> CHECK_RB2_PARITY,
      R1 -> OP1AR,
      R2 -> OP2AR,
      R1 -> RA1,
      R2 -> RA2,
      Ø -> SAR,
      1 -> RESET_RETRY_POINT,
      1 -> LAST_X_CYCLE,
      1 -> BRANCH,
      IDLE_LOOP_A -> ADDRESS;

ENDB CD;
```

APPENDIX D
MULTIPLY SHORT

ALGORITHM FOR MULTIPLY SHORT

/* MER, ME -- 3C, 7C */

MULTIPLY SHORT (SHORT OPERANDS, LONG PRODUCT)

MNEMONICS:  MER, ME
OP CODE:  3C, 7C
FORMAT:  RR, RX
OPERATION:  THE NORMALIZED PRODUCT OF THE SECOND OPERAND (THE
   MULTIPLIER) AND THE FIRST OPERAND (THE MULTIPLICAND) IS
   PLACED IN THE FIRST OPERAND LOCATION.

MULTIPLICATION OF TWO FLOATING-POINT NUMBERS CONSISTS OF
   EXPONENT ADDITION AND FRACTION MULTIPLICATION.

WHEN EITHER OR BOTH OPERAND FRACTIONS ARE ZERO, THE RESULT IS
   MADE A TRUE ZERO, AND NO EXPONENT OVERFLOW OR EXPONENT
   UNDERFLOW OCCURS.

THE SIGN OF THE PRODUCT IS DETERMINED BY THE RULES OF ALGEBRA
   ALGEBRA, EXCEPT THAT THE SIGN IS ALWAYS ZERO WHEN THE RESULT
   IS MADE A TRUE ZERO.

CONDITION CODE:  UNCHANGED

INTERRUPTIONS REPORTED BY F-UNIT:  EXPONENT OVERFLOW
                                   EXPONENT UNDERFLOW

PIPELINE SEQUENCE:  D A B X - - - X W
    (ONLY ONE SEQUENCE IS NEEDED BECAUSE OPERAND 1 IS READ FROM
        AND WRITTEN TO A REGISTER ON THE F-UNIT)

TIMING: ON AVERAGE, CYCLE COUNT < 4.3 CYCLES
    4 CYCLES IF IT CAN BE PREDICTED THAT POSTNORMALIZATION
        CAN BE BYPASSED (MOST LIKELY CASE)
    5 CYCLES IF IT CANNOT BE PREDICTED THAT POSTNORMALI-
        ZATION CAN BE BYPASSED, BUT IT CAN BE PREDICTED
        THAT THERE WILL BE NO EXPONENT OVERFLOW OR
        UNDERFLOW   (2ND MOST LIKELY CASE)
    6 CYCLES IF IT CANNOT BE PREDICTED THAT POSTNORMALI-
        ZATION CAN BE BYPASSED, AND IT CANNOT BE
        PREDICTED THAT THERE WILL BE NO EXPONENT
        OVERFLOW OR UNDERFLOW

/* MER, ME -- 3C, 7C */

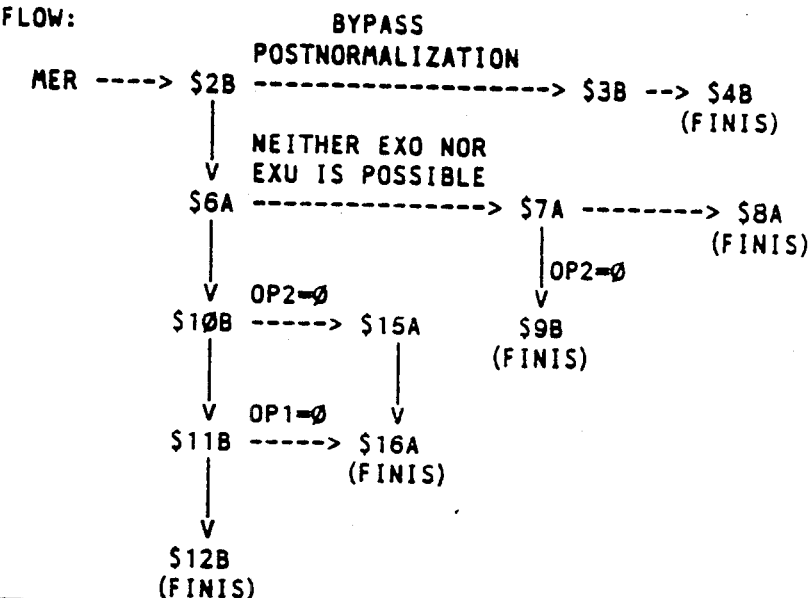

/* MER, ME -- 3C, 7C */

BEGIN MER;

CSECT FCSA0;    ORIGIN '1F'X;

MER:  SHORT_OPERAND -> RB1,
      SHORT_OPERAND -> RB2,
      (0/(0..55),RB2(8..21)/(56..69)) -> ACC,
      RB2(22..67) -> UM,
      (RB2(22..31)/(0..9),0/(10..13)) -> RCDR,
      (RB1(1..7) + RB2(1..7)) -> EXPONENT_CALCULATION,
      EXPONENT_CALCULATION -> EXPR,
      RB1(0) XOR RB2(0) -> SIGN,
      SIGN -> SIGN_TRIGGER,
      RA1 -> RA1,    /* HOLD RB1 FOR MULTIPLICAND */
      TPR2 -> RA2,   /* SET UP FOR CYCLE $6A */

```
        HOLD_NEXT_CYCLE -> RB_CONTROL,
        Ø -> SUBTRACT_OPERATION,
        SUBTRACT_OPERATION -> SUBTRACT_TRIGGER,
        RB1(8..67) -> WRITE_BUS_FRACTION,
        TPR2 -> WRITE_ADDRESS,      /* SAVE OP1 FRACTION IN TPR2 */
        Ø -> CARRY_TRIGGER,
        Ø -> SR,
        Ø -> CR,
        (Ø/(Ø..1),RB1(8..63)/(2..57),Ø/(58..59)) -> PD,
        Ø -> PB,       /* LOAD PD AND PB FOR RESIDUE CHECKING */
        (RB1(8..11) ¬= Ø) -> OP1_NORMAL_TRIGGER,
        (RB2(8..11) ¬= Ø) -> OP2_NORMAL_TRIGGER,
        (RB1(8..11)*RB2(8..11) > 'F'X) -> PRODUCT_NORMAL_TRIGGER,
        (RB2(8..67)=Ø) -> ZERO_TEST,
        ZERO_TEST -> ZERO_TRIGGER,
        1 -> TEST_DATA_VALID,
        1 -> BRANCH,
        $2B -> ADDRESS;
                    /* MER, ME -- 3C, 7C */

CSECT FCSB;

$2B:    SHORT_OPERAND -> RB1,
        SHORT_OPERAND -> RB2,
        PS -> SR,
        PC -> CR,                   /* 1ST MULTIPLY */
        PS -> AR,
        PC -> BR,
        ACC(56..69) -> RCDR,
        Ø -> ACC,
        Ø -> CARRY_TRIGGER,
        (ACC(56..69)/(7Ø..83),UM(7Ø..1Ø1)/(84..115)) -> UM,
        EXPR - '4Ø'X -> EXPONENT_CALCULATION,
        EXPONENT_CALCULATION -> EXPR,
        Ø -> CHECK_RB2_PARITY,
        RA1 -> RA1,
        RA2 -> RA2,   /* HOLD FOR CYCLE $6A */
        HOLD_NEXT_CYCLE -> RB_CONTROL,
        ZERO_TRIGGER -> ZERO_TEST,
        ZERO_TEST -> ZERO_TRIGGER,       /* OP2 = Ø */
        ¬PRODUCT_NORMAL_TRIGGER -> BRANCH,
        $6A -> ADDRESS;

$3B:    SHORT_OPERAND -> RB1,
        SHORT_OPERAND -> RB2,
        PS -> SR,
        PC -> CR,                   /* 2ND MULTIPLY */
        PS -> AR,
        PC -> BR,
        ACC(56..69) -> RCDR,
        INHIBIT_RECOMPLEMENT -> AA_OPERATION,
        CARRY_TRIGGER -> AA_CARRY_IN_BIT69,
        AA_SUM -> ACC,
        CARRY_OUT_FROM_AA(56) -> CARRY_TRIGGER,
        (ACC(56..69)/(7Ø..83),UM(7Ø..1Ø1)/(84..115)) -> UM,
        Ø -> CHECK_RB2_PARITY,
        1 -> ENDING_NEXT_CYCLE;
                    /* MER, ME -- 3C, 7C */
```

CSECT FCSB;

$4B: SIGN_TRIGGER -> SIGN,
 Ø -> ZERO_TEST,
 SIGN & ¬ZERO_TEST & (EXU_MASK | ¬EXPR(-1))
 -> WRITE_BUS_SIGN,
 IF (ZERO_TEST | (EXPR(-1) & ¬EXU_MASK)) THEN Ø
 ELSE EXPR(1..7) ENDF -> WRITE_BUS_EXP,
 IF (ZERO_TEST | (EXPR(-1) & ¬EXU_MASK)) THEN Ø
 ELSE AA_SUM(Ø..59) ENDF -> WRITE_BUS_FRACTION,
 OP1AR -> WRITE_ADDRESS,
 LONG -> WRITE_LENGTH,
 1 -> RESET_RETRY_POINT,
 INHIBIT_RECOMPLEMENT -> AA_OPERATION,
 CARRY_TRIGGER -> AA_CARRY_IN_BIT69,
 AA_SUM -> ACC,        /* NECESSARY FOR RESIDUE CHECKING */
 Ø -> UM,
 EXPR(Ø) & ¬EXPR(-1) -> EXO_INTERRUPT,
 EXPR(-1) & EXU_MASK & ¬ZERO_TEST -> EXU_INTERRUPT,
 Ø -> CHECK_RB2_PARITY,
 SHORT_OPERAND -> RB1,   /* DON'T CHANGE RB LENGTH WHILE */
 SHORT_OPERAND -> RB2,   /*        HOLDING READ ADDRESSES */
 R1 -> OP1AR,
 R2 -> OP2AR,
 R1 -> RA1,
 R2 -> RA2,
 Ø -> SAR,
 1 -> LAST_X_CYCLE,
 1 -> BRANCH,
 IDLE_LOOP_A -> ADDRESS;
                   /* MER, ME -- 3C, 7C */

CSECT FCSA1;

$6A: SHORT_OPERAND -> RB1,
 SHORT_OPERAND -> RB2,
 PS -> SR,
 PC -> CR,                 /* 2ND MULTIPLY */
 PS -> AR,
 PC -> BR,
 ACC(56..69) -> RCDR,
 INHIBIT_RECOMPLEMENT -> AA_OPERATION,
 CARRY_TRIGGER -> AA_CARRY_IN_BIT69,
 AA_SUM -> ACC,
 CARRY_OUT_FROM_AA(56) -> CARRY_TRIGGER,
 (ACC(56..69)/(7Ø..83),UM(7Ø..1Ø1)/(84..115)) -> UM,
 ZERO_TRIGGER -> ZERO_TEST,
 ZERO_TEST -> ZERO_TRIGGER,          /* OP2 = Ø */
 Ø -> CHECK_RB2_PARITY,
 RA2 -> RA2,              /* OP1 */
 (EXPR < '1Ø'X) | EXPR(Ø) -> BRANCH,
 $1ØB -> ADDRESS;   /* NOTE: EXPR(Ø) => EXPR(-1) */

$7A: AA_SUM -> ACC,
 (ACC(56..69)/(7Ø..83),UM(7Ø..1Ø1)/(84..115)) -> UM,
 INHIBIT_RECOMPLEMENT -> AA_OPERATION,
 CARRY_TRIGGER -> AA_CARRY_IN_BIT69,
 Ø -> CARRY_TRIGGER,
 (RB2(8..67)=Ø) -> ZERO_TEST,

```
            ZERO_TEST -> ZERO_TRIGGER,      /* TEST FOR OP1 = 0 */
            SHORT_OPERAND -> RB1,    /* DON'T CHANGE RB LENGTH WHILE */
            SHORT_OPERAND -> RB2,    /*     HOLDING READ ADDRESSES */
            1 -> ENDING_NEXT_CYCLE,
            ZERO_TRIGGER -> BRANCH,
            $9B -> ADDRESS;          /* BRANCH IF OP2 = 0 */
                    /* MER, ME -- 3C, 7C */

CSECT FCSA1;

$8A:    SIGN_TRIGGER -> SIGN,
        ZERO_TRIGGER -> ZERO_TEST,
        SIGN & ¬ZERO_TEST & (EXU_MASK | ¬EXPR(-1))
                                        -> WRITE_BUS_SIGN,
        IF (ZERO_TEST | (EXPR(-1) & ¬EXU_MASK)) THEN 0
            ELSE EXPONENT_CALCULATION(1..7) ENDF -> WRITE_BUS_EXP,
        IF (ZERO_TEST | (EXPR(-1) & ¬EXU_MASK)) THEN 0
            ELSE PN_SHIFTER ENDF -> WRITE_BUS_FRACTION,
        LEADING_ZERO_DIGIT_COUNT -> NORMALIZE_COUNT,
        IF CARRY_TRIGGER THEN EXPR + 1
                        ELSE EXPR - NORMALIZE_COUNT ENDF
                                        -> EXPONENT_CALCULATION,
        IF CARRY_TRIGGER THEN RIGHT 1
                        ELSE LEFT LEADING_ZERO_DIGIT_COUNT ENDF
                                        -> NORMALIZE_SHIFT_AMOUNT,
        OP1AR -> WRITE_ADDRESS,
        LONG -> WRITE_LENGTH,
        1 -> RESET_RETRY_POINT,
        0 -> CHECK_RB2_PARITY,
        SHORT_OPERAND -> RB1,    /* DON'T CHANGE RB LENGTH WHILE */
        SHORT_OPERAND -> RB2,    /*     HOLDING READ ADDRESSES */
        R1 -> OP1AR,
        R2 -> OP2AR,
        R1 -> RA1,
        R2 -> RA2,
        0 -> SAR,
        1 -> LAST_X_CYCLE,
        1 -> BRANCH,
        IDLE_LOOP_B -> ADDRESS;

CSECT FCSB;

$9B:    0 -> SIGN,
        SIGN -> SIGN_TRIGGER,
        1 -> ZERO_TEST,          /* OP2 FRACTION = 0 */
        SIGN & ¬ZERO_TEST & (EXU_MASK | ¬EXPR(-1))
                                        -> WRITE_BUS_SIGN,
        IF (ZERO_TEST | (EXPR(-1) & ¬EXU_MASK)) THEN 0
                        ELSE EXPR(1..7) ENDF -> WRITE_BUS_EXP,
        IF (ZERO_TEST | (EXPR(-1) & ¬EXU_MASK)) THEN 0
            ELSE PN_SHIFTER ENDF -> WRITE_BUS_FRACTION,
        OP1AR -> WRITE_ADDRESS,
        LONG -> WRITE_LENGTH,
        1 -> RESET_RETRY_POINT,
        0 -> CHECK_RB2_PARITY,
        SHORT_OPERAND -> RB1,    /* DON'T CHANGE RB LENGTH WHILE */
        SHORT_OPERAND -> RB2,    /*     HOLDING READ ADDRESSES */
        R1 -> OP1AR,
        R2 -> OP2AR,
        R1 -> RA1,
        R2 -> RA2,
        0 -> SAR,
        1 -> LAST_X_CYCLE,
        1 -> BRANCH,
        IDLE_LOOP_A -> ADDRESS;

CSECT FCSB;

$10B:   AA_SUM -> ACC,
        INHIBIT_RECOMPLEMENT -> AA_OPERATION,
        CARRY_TRIGGER -> AA_CARRY_IN_BIT69,
        0 -> CARRY_TRIGGER,
        (ACC(56..69)/(70..83),UM(70..101)/(84..115)) -> UM,
        (RB2(8..67)=0) -> ZERO_TEST,
        ZERO_TEST -> ZERO_TRIGGER,      /* TEST IF OP1 = 0 */
        SHORT_OPERAND -> RB1,    /* DON'T CHANGE RB LENGTH WHILE */
        SHORT_OPERAND -> RB2,    /*     HOLDING READ ADDRESSES */
        ZERO_TRIGGER -> BRANCH,
        $15A -> ADDRESS;                 /* BRANCH IF OP2 = 0 */
```

```
S11B: EXPONENT_CALCULATION -> EXPR,
      LEADING_ZERO_DIGIT_COUNT -> NORMALIZE_COUNT,
      IF CARRY_TRIGGER THEN EXPR + 1
                        ELSE EXPR - NORMALIZE_COUNT ENDF
                                    -> EXPONENT_CALCULATION,
      HOLD -> SUM_ZERO_DIGIT_TEST,
      SHORT_OPERAND -> RB1,   /* DON'T CHANGE RB LENGTH WHILE */
      SHORT_OPERAND -> RB2,   /*       HOLDING READ ADDRESSES */
      1 -> ENDING_NEXT_CYCLE,
      ZERO_TRIGGER -> BRANCH,
      S16A -> ADDRESS;      /* BRANCH IF OP1 = 0 */

S12B: SIGN_TRIGGER -> SIGN,
      0 -> ZERO_TEST,
      SIGN & ¬ZERO_TEST & (EXU_MASK | ¬EXPR(-1))
                                      -> WRITE_BUS_SIGN,
      IF (ZERO_TEST | (EXPR(-1) & ¬EXU_MASK)) THEN 0
                ELSE EXPR(1..7) ENDF -> WRITE_BUS_EXP,
      IF (ZERO_TEST | (EXPR(-1) & ¬EXU_MASK)) THEN 0
           ELSE PN_SHIFTER ENDF -> WRITE_BUS_FRACTION,
      IF CARRY_TRIGGER THEN RIGHT 1
                ELSE LEFT LEADING_ZERO_DIGIT_COUNT ENDF
                            -> NORMALIZE_SHIFT_AMOUNT,
      OP1AR -> WRITE_ADDRESS,
      LONG -> WRITE_LENGTH,
      1 -> RESET_RETRY_POINT,
      EXPR(0) & ¬EXPR(-1) -> EXO_INTERRUPT,
      EXPR(-1) & EXU_MASK & ¬ZERO_TEST -> EXU_INTERRUPT,
      0 -> CHECK_RB2_PARITY,
      SHORT_OPERAND -> RB1,   /* DON'T CHANGE RB LENGTH WHILE */
      SHORT_OPERAND -> RB2,   /*       HOLDING READ ADDRESSES */
      R1 -> OP1AR,
      R2 -> OP2AR,
      R1 -> RA1,
      R2 -> RA2,
      0 -> SAR,
      1 -> LAST_X_CYCLE,
      1 -> BRANCH,
      IDLE_LOOP_A -> ADDRESS;

/* MER, ME -- 3C, 7C */
CSECT FCSA1;

S15A: 1 -> ENDING_NEXT_CYCLE,   /* PRODUCT IS ZERO */
      SHORT_OPERAND -> RB1,   /* DON'T CHANGE RB LENGTH WHILE */
      SHORT_OPERAND -> RB2,   /*       HOLDING READ ADDRESSES */

S16A: 0 -> SIGN,
      SIGN -> SIGN_TRIGGER,
      1 -> ZERO_TEST,         /* OP2 FRACTION = 0 */
      SIGN & ¬ZERO_TEST & (EXU_MASK | ¬EXPR(-1))
                                      -> WRITE_BUS_SIGN,
      IF (ZERO_TEST | (EXPR(-1) & ¬EXU_MASK)) THEN 0
                ELSE EXPR(1..7) ENDF -> WRITE_BUS_EXP,
      IF (ZERO_TEST | (EXPR(-1) & ¬EXU_MASK)) THEN 0
           ELSE PN_SHIFTER ENDF -> WRITE_BUS_FRACTION,
      OP1AR -> WRITE_ADDRESS,
      LONG -> WRITE_LENGTH,
      1 -> RESET_RETRY_POINT,
      0 -> CHECK_RB2_PARITY,
      SHORT_OPERAND -> RB1,   /* DON'T CHANGE RB LENGTH WHILE */
      SHORT_OPERAND -> RB2,   /*       HOLDING READ ADDRESSES */
      R1 -> OP1AR,
      R2 -> OP2AR,
      R1 -> RA1,
      R2 -> RA2,
      0 -> SAR,
      1 -> LAST_X_CYCLE,
      1 -> BRANCH,
      IDLE_LOOP_B -> ADDRESS;

ENDB MER;
```

What is claimed is:

1. A system responsive to a floating point instruction for processing floating point first and second operands, each having a fraction and an exponent, comprising:
   (a) determining means for determining from said operands whether said operands have a predetermined condition with respect to said instruction;
   (b) primitive operator means for performing one or more of a plurality of floating point primitive operations on said operand data including the following primitive operations in respective machine cycles;
      (1) means for comparing the exponents and calculating the alignment shift amount,
      (2) means for aligning the fraction that has the smaller exponent,
      (3) means for algebraically adding the fractions and obtaining the absolute value of the sum,
      (4) means for testing if the result of said addition is zero, counting the number of leading zero digits in the result and adjusting the exponent,
      (5) means for postnormalizing the fraction, determining exponent underflow and significant exceptions,
   (c) sequencing means, responsive to said instruction, for sequencing said primitive operator means to perform a plurality of said primitive operations to execute said instruction; and
   (d) selector means, connected to said sequencing means and responsive to said determining means for bypassing selected ones of said primitive operations, thereby reducing the number of machine cycles utilized in the execution of said instruction when said operand data has said predetermined condition with respect to said instruction.

2. The system of claim 1 wherein,
said determining means determines that the fractions are added, the exponents are equal, and at least one fraction is normalized whereby alignment is not needed, and exponent underflow cannot occur, said selector means bypassing said means for aligning and whereby said means for testing the result and said means for postnormalizing occur in the same cycle.

3. The system of claim 1 wherein,
said determining means determines that the fractions are added, the exponents are equal, and the exponent is $>='10'$ hex whereby alignment is not needed, and exponent udnerflow cannot occur, said selector means bypassing said means for aligning and whereby said means for testing the result and means for postnormalizing occur in the same cycle.

4. The system of claim 1 wherein,
said determining means determines that the fractions are added, the exponents are not equal, and the first digit of the fraction with the larger exponent is $>='1'$ hex and $<='E'$ hex whereby post-normalization is not needed, and exponent underflow cannot occur, said selector means bypassing said means for testing the result whereby said means for algebraically adding and said means for postnormalizing operate in the same cycle.

5. The system of claim 1 wherein,
said determining means determines that the fractions are subtracted, the exponents are equal, the exponent is $>='10'$ hex, whereby alignment is not needed, and exponent underflow cannot occur, said selector means bypassing said means for aligning and whereby said means for testing the result and said means for postnormalizing operate in the same cycle.

6. The system of claim 1 wherein,
said determining means determines that the fractions are subtracted, the exponents are not equal, first digit of the fraction with the larger exponent is $>='2'$ hex, whereby post-normalization is not needed, and exponent underflow cannot occur, said selector means bypassing said means for testing the result whereby said means for algebraically adding and said means for postnormalizing operate in the same cycle.

7. The system of claim 1 wherein,
said determining means determines that the fractions are added, the exponents are equal the exponent is $<='10'$ hex, both fractions are not normalized, whereby alignment is not needed, said selector means bypassing said means for aligning.

8. The system of claim 1 wherein,
said determining means determines that the fractions are added, the exponents are not equal, first digit of the fraction with the larger exponent is $='F'$ hex, whereby exponent underflow cannot occur, whereby said means for testing the result and said means for postnormalizing operate in the same cycle.

9. The system of claim 1 wherein,
said determining means determines that the fractions are added, the exponents are not equal, the larger exponent is $>='10'$ hex, first digit of the fraction with the larger exponent is $='0'$ hex, whereby exponent underflow cannot occur, whereby said means for testing the result and said means for postnormalizing operate in the same cycle.

10. The system of claim 1 wherein,
said determining means determines that the fractions are subtracted, the exponents are equal, the exponent is $<'10'$ hex, whereby alignment is not needed, said selector means bypassing said means for aligning.

11. The system of claim 1 wherein,
said determining means determines that the fractions are subtracted, the exponents are not equal, the larger exponent is $>='10'$ hex, first digit of the fraction with the larger exponent is $<'2'$ hex, whereby exponent underflow cannot occur, whereby said means for testing the result and said means for postnormalizing operate in the same cycle.

12. The system of claim 1 including,
means for determining that the product fraction does not have to be postnormalized.

13. The system of claim 1 including,
means for signalling termination one cycle early.

14. The method of executing a floating-point multiplication of operand 1 and operand 2 comprising the steps:
   (1) loading the multiplier fraction from operand 2 into a recoder and into an accumulator and providing the multiplicand fraction operand 1 to a multiplier, the output of said recoder controlling said multiplier,
   (2) multiplying the multiplicand by the multiplier using a carry-save-add process to form a carry and sum,
   (3) adding the carry and sum using an absolute adder, and (4) normalizing the fraction and storing the result into a result floating-point register, control steps (2) and (3) for two cycles for short multiplication overlapping step (3) with step (2) units 2nd cycle, determine if the product fraction need be normalized, bypass step (4) using postnormalization bypass.

* * * * *